(12) United States Patent
Zhang et al.

(10) Patent No.: US 12,153,196 B2
(45) Date of Patent: Nov. 26, 2024

(54) OPTICAL IMAGING LENS

(71) Applicant: ZHEJIANG SUNNY OPTICS CO., LTD., Zhejiang (CN)

(72) Inventors: Zhanfei Zhang, Zhejiang (CN); Lin Huang, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 905 days.

(21) Appl. No.: 17/255,444

(22) PCT Filed: Aug. 23, 2019

(86) PCT No.: PCT/CN2019/102146
§ 371 (c)(1),
(2) Date: Dec. 23, 2020

(87) PCT Pub. No.: WO2020/119172
PCT Pub. Date: Jun. 18, 2020

(65) Prior Publication Data
US 2021/0255431 A1    Aug. 19, 2021

(30) Foreign Application Priority Data
Dec. 14, 2018   (CN) .......................... 201811533149.0

(51) Int. Cl.
*G02B 13/18*        (2006.01)
*G02B 9/00*         (2006.01)
(Continued)

(52) U.S. Cl.
CPC ........... *G02B 13/0045* (2013.01); *G02B 9/64* (2013.01); *G02B 13/0015* (2013.01); *G02B 27/0025* (2013.01)

(58) Field of Classification Search
CPC . G02B 9/00; G02B 9/64; G02B 13/00; G02B 13/001; G02B 13/0015;
(Continued)

(56) References Cited

U.S. PATENT DOCUMENTS 9,523,841 B1 * 12/2016 Chen ................... G02B 27/0025
10,488,627 B2 * 11/2019 Jhang ....................... G02B 9/64
10,571,661 B2 * 2/2020 Huang ...................... G02B 9/64

FOREIGN PATENT DOCUMENTS

CN         206757167 U     12/2017
CN         107643586 A      1/2018
(Continued)

*Primary Examiner* — Thong Q Nguyen
(74) *Attorney, Agent, or Firm* — Samson G. Yu

(57) ABSTRACT

An optical imaging lens is provided. The optical imaging lens includes sequentially from an object side to an image side along an optical axis: a first lens, a second lens, a third lens, a fourth lens, a fifth lens, a sixth lens, a seventh lens and an eighth lens. The first lens has a positive refractive power; the fourth lens has a positive refractive power; the fifth lens has a negative refractive power; the seventh lens has a positive refractive power; the eighth lens has a negative refractive power; and a total effective focal length f of the optical imaging lens, an entrance pupil diameter EPD of the optical imaging lens and a distance TTL from the object side surface of the first lens to the imaging surface of the optical imaging lens on the optical axis satisfy 5 mm<f×(TTL/EPD) <7.2 mm.

20 Claims, 23 Drawing Sheets

(51) Int. Cl.
*G02B 9/64* (2006.01)
*G02B 13/00* (2006.01)
*G02B 27/00* (2006.01)

(58) Field of Classification Search
CPC .......................... G02B 13/002; G02B 13/0045; G02B 13/008; G02B 13/14; G02B 13/143; G02B 13/146; G02B 13/18; G02B 27/0025
USPC .................................. 359/713, 749, 750, 754
See application file for complete search history.

(56) References Cited

FOREIGN PATENT DOCUMENTS

| | | |
|---|---|---|
| CN | 107703609 A | 2/2018 |
| CN | 108121053 A | 6/2018 |
| CN | 109343205 A | 2/2019 |
| CN | 209327657 U | 8/2019 |
| JP | 02167514 A | 6/1990 |
| JP | 10206729 A | 8/1998 |

* cited by examiner

OPTICAL IMAGING LENS

CROSS-REFERENCE TO RELATED APPLICATIONS

The disclosure claims priority to and the benefit of Chinese Patent Application No. 201811533149.0, filed in the China National Intellectual Property Administration (CNIPA) on Dec. 14, 2018, the content of which is incorporated herein by reference in its entirety.

TECHNICAL FIELD

The disclosure relates to an optical imaging lens, and more particularly, to an optical imaging lens including eight lenses.

BACKGROUND

With the rapid development of smart phone market, the camera function of mobile phone has become one of the important standards to measure the performance of a mobile phone. The imaging quality of the lens can be influenced by materials, coating quality, optical and structural design, aperture type, manufacturing process and so on, and the number of pieces of lens is the most direct influencing factor. The lens with a large number of pieces of lenses (for example, eight lenses) can effectively improve the light convergence capability of the lens, enhance the resolving power and contrast ratio of the lens, and can also improve the flare phenomenon in the dark.

Meanwhile, in order to enhance the shooting effect in the dark and weak light, obtain the shooting effect with small depth of field and virtual background and higher shutter speed, a large-aperture imaging lens needs to be used, and along with the continuous deepening of commercialization, the optical lens also develops towards miniaturization and low processing cost.

SUMMARY

An optical imaging lens is provided, such as an optical imaging lens having a large aperture characteristic, which is applicable to portable electronic products and can solve at least or partially at least one of the above-mentioned disadvantages in the related art.

An optical imaging lens is provided. The optical imaging lens sequentially from an object side to an image side along an optical axis includes: a first lens, a second lens, a third lens, a fourth lens, a fifth lens, a sixth lens, a seventh lens, and an eighth lens, wherein the first lens has a positive refractive power; the second lens has a refractive power; the third lens has a refractive power; the fourth lens has a positive refractive power; the fifth lens has a negative refractive power; the sixth lens has a refractive power; the seventh lens has a positive refractive power; and the eighth lens has a negative refractive power.

In one implementation mode, a total effective focal length f of the optical imaging lens, EPD is an Entrance Pupil Diameter of the optical imaging lens, and TTL is a distance along the optical axis between an object side surface of the first lens and an imaging surface of the optical imaging lens satisfies 5 mm<f×(TTL/EPD)<7.2 mm.

In one implementation mode, an effective focal length f4 of the fourth lens and an effective focal length f5 of the fifth lens satisfy $-3.0<f4/f5<0$.

In one implementation mode, the total effective focal length f of the optical imaging lens and a curvature radius R14 of an object side surface of the seventh lens satisfy $0.5<f/R14<1.2$.

In one implementation mode, a curvature radius R15 of an object side surface of the eighth lens and a curvature radius R16 of an image side surface of the eighth lens satisfy $1.5<R15/R16<4.0$.

In one implementation mode, the total effective focal length f of the optical imaging lens and a combined focal length f34 of the third lens and the fourth lens satisfy $0.5<f/f34<1.0$.

In one implementation mode, the total effective focal length f of the optical imaging lens and a combined focal length f56 of the fifth lens and the sixth lens satisfy $-1.5<f/f56<0$.

In one implementation mode, an effective focal length f7 of the seventh lens and an effective focal length f8 of the eighth lens satisfy $-1.5<f7/f8<-0.5$.

In one implementation mode, the total effective focal length f of the optical imaging lens and an effective focal length f1 of the first lens satisfy $0.5<f/f1<1.0$.

In one implementation mode, the total effective focal length f of the optical imaging lens, an effective focal length f2 of the second lens, an effective focal length f3 of the third lens, and an effective focal length f6 of the sixth lens satisfies $|f/f2|+|f/f3|+|f/f6|<1.5$.

In one implementation mode, an effective radius DT31 of an object side surface of the third lens and an effective radius DT62 of an image side surface of the sixth lens satisfy $0.8<DT31/DT62<1.0$.

In one implementation mode, a curvature radius R11 of the object side surface of the sixth lens and a curvature radius R12 of an image side surface of the sixth lens satisfy $0.5<R11/R12<3.5$.

In one implementation mode, a center thickness CT3 along the optical axis of the third lens, the center thickness CT4 along the optical axis of the fourth lens, the center thickness CT5 along the optical axis of the fifth lens, and the center thickness CT6 along the optical axis of the sixth lens satisfy $(CT3+CT4+CT5+CT6)/4<0.35$.

In one implementation mode, a sum of spacing distances ΣAT between any two adjacent lenses in the first lens to the eighth lens along the optical axis and the distance TTL along the optical axis between an object side surface of the first lens and an imaging surface of an optical imaging lens satisfy $ΣAT/TTL<0.3$.

According to the disclosure, eight lenses are adopted, and the optical imaging lens has at least one beneficial effect of large aperture, miniaturization, high imaging quality and the like by reasonably distributing the optical power, the surface shape, the center thickness of each lens, the on-axis distance between each of the lenses.

BRIEF DESCRIPTION OF THE DRAWINGS

Other features, objects, and advantages of the disclosure will become apparent from the following detailed description of non-limiting embodiments, taken in conjunction with the accompanying drawings. In the drawings.

DETAILED DESCRIPTION OF THE EMBODIMENTS

Figure 1:
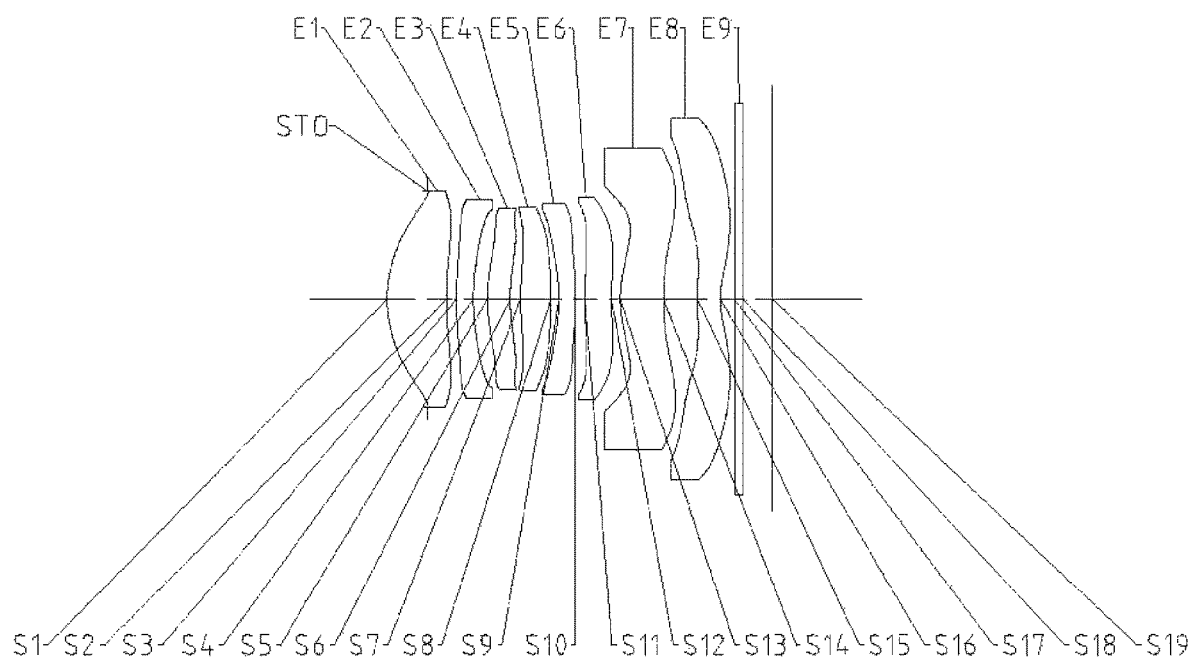
FIG. 1 shows a schematic view showing a structure of an optical imaging lens according to Embodiment 1 of the disclosure.

For a better understanding of the disclosure, various aspects of the disclosure will be described in more detail with reference to the accompanying drawings. It is to be understood that these detailed descriptions are merely illustrative of exemplary embodiments of the disclosure and are not intended to limit the scope of the disclosure in any way. Like reference numerals refer to like elements throughout.

The expression "and/or" includes any and all combinations of one or more of the associated listed items.

It should be noted that in this specification, the expressions "first", "second", "third", etc. are used solely to distinguish one feature from another and do not denote any limitation of a feature. Thus, the first lens discussed below may also be referred to as a second lens or a third lens without departing from the teachings of the disclosure.

In the drawings, the thickness, size and shape of the lens have been slightly exaggerated for ease of illustration. In particular, the spherical or aspherical shape shown in the drawings is illustrated by way of example. That is, the spherical or aspherical shape is not limited to the spherical or aspherical shape shown in the drawings. The drawings are merely exemplary and are not strictly to scale.

Herein, a paraxial region refers to a region near the optical axis. If the lens surface is convex and the position of the convex surface is not defined, then it means that the lens surface is convex at least in the paraxial region; and if the lens surface is concave and the concave position is not defined, then it means that the lens surface is concave at least in the paraxial region. The surface of each lens closest to the object to be photographed is called an object side surface of the lens, and the surface of each lens closest to the imaging surface is called the image side surface of the lens.

It should also be understood that the terms "include", "including", "having", "comp vector height" and/or "comprising", when used in this specification, mean that the stated features, elements and/or components are present, but does not exclude the presence or addition of one or more other features, elements, components and/or a combination thereof. In addition, when expressions such as "at least one of . . . " appear after the list of listed features, it modifies the entire listed features and does not modify an individual element in the list. In addition, when describing the embodiments of the disclosure, the use of "may" means "one or more embodiments of the disclosure". Also, the expression "exemplary" is intended to refer to an example or illustration.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging lens according to an exemplary embodiment of the disclosure may include eight lenses having refractive powers, that is, a first lens, a second lens, a third lens, a fourth lens, a fifth lens, a sixth lens, a seventh lens, and an eighth lens. The eight lenses are sequentially arranged from the object side to the image side along the optical axis, and each adjacent lens has an air space therebetween.

In one implementation mode, the first lens has a positive refractive power; the second lens has a positive refractive power or a negative refractive power; the third lens has a positive refractive power or a negative refractive power; the fourth lens has a positive refractive power; the fifth lens has a negative refractive power; the sixth lens has a positive refractive power or a negative refractive power; the seventh lens has a positive refractive power; the eighth lens has a negative refractive power. The refractive power of each lens is reasonably adjusted to ensure that the lens has good aberration correcting capability.

In one implementation mode, an object side surface of the first lens can be a convex surface and an image side surface can be a concave surface; an object side surface of the third lens can be a convex surface, and an image side surface of the third lens can be a concave surface; an object side surface of the sixth lens can be a convex surface, and an image side surface the sixth lens can be a concave surface; an object side surface of the seventh lens can be a convex surface, and an image side surface the seventh lens can be a concave surface; an object side surface of the eighth lens can be a convex surface and an image side surface the eighth lens can be a concave surface.

In one implementation mode, the optical imaging lens of the disclosure satisfies the condition expression 5 mm<f×(TTL/EPD)<7.2 mm, wherein f is a total effective focal length of an optical imaging lens, EPD is an entrance pupil diameter of the optical imaging lens, and TTL is a distance along the optical axis between an object side surface of the first lens and an imaging surface of the optical imaging lens. More specifically, f, TTL and EPD further satisfy 5.78 mm≤f×(TTL/EPD)≤7.09 mm. Satisfaction of the condition expression of 5 mm<f×(TTL/EPD)<7.2 mm can effectively control the total length of the imaging lens, so that the miniaturization of the system is facilitated, the lens can be better suitable for portable electronic products which tend to be light and thin in the market, meanwhile, the light passing amount and the relative illuminance of the lens can be effectively improved, and the imaging quality under dark light conditions is enhanced.

In one implementation mode, the optical imaging lens of the disclosure satisfies the condition expression −3.0<f4/f5<0, wherein f is a total effective focal length of an optical imaging lens, f4 is an effective focal length of the fourth lens, and f5 is an effective focal length of the fifth lens. More specifically, f4 and f5 further satisfy −2.74≤f4/f5≤−0.13. By reasonably controlling the refractive powers of the fourth lens and the fifth lens, excessive deflection of light can be effectively avoided, the light convergence capacity of the lens is improved, the focusing position of the light can be adjusted, the total length of the optical imaging lens is shortened, and meanwhile, the correction of system field curvature is facilitated.

In one implementation mode, the optical imaging lens of the disclosure satisfies the condition expression 0.5<f/R14<1.2, wherein f is the total effective focal length of an optical imaging lens and R14 is a curvature radius of the image side surface of the seventh lens. More specifically, f and R14 further satisfy 0.60≤f/R14≤1.08. Reasonable control of the ratio of f to R14 is beneficial to control the chief ray angle and better match the CRA of the chip.

In one implementation mode, the optical imaging lens of the disclosure satisfies the condition expression 1.5<R15/R16<4.0, wherein R15 is a curvature radius of the object side surface of the eighth lens and R16 is a curvature radius of the image side surface of the eighth lens. More specifically, R15 and R16 further satisfy 1.7<R15/R16<3.8, e.g. 1.92≤R15/R16≤3.67. By reasonably controlling the curvature radius of the eighth lens, the surface shape of the eighth lens can be effectively prevented from being excessively bent, the processing difficulty can be reduced, and the capability of balancing aberration and distortion of the optical imaging lens can be improved.

In one implementation mode, the optical imaging lens of the disclosure satisfies the condition expression 0.5<f/f34<1.0, wherein f is the total effective focal length of an optical imaging lens and f34 is a combined focal length of the third lens and the fourth lens. More specifically, f and f34 further satisfy 0.54≤f/f34≤0.78. The total effective focal length of the system and the combined focal length of the third lens and the fourth lens are reasonably selected, so that the freedom degree of surface change of the lens is higher, and the capability of correcting astigmatism and field curvature of the optical imaging lens can be effectively improved.

In one implementation mode, the optical imaging lens of the disclosure satisfies the condition expression −1.5<f/f56<0, wherein f is the total effective focal length of an optical imaging lens and f56 is a combined focal length of the fifth lens and the sixth lens. More specifically, f and f56 further satisfy −1.30≤f/f4≤−0.45. The total effective focal length of the system and the combined focal length of the fifth lens and the sixth lens are reasonably controlled, so that aberration correction is facilitated, the total length of the optical imaging lens can be shortened, and the requirement of miniaturization is met.

In one implementation mode, the optical imaging lens of the disclosure satisfies the condition expression −1.5<f7/f8<−0.5, wherein f7 is an effective focal length of the seventh lens, and f8 is an effective focal length of the eighth lens. More specifically, f7 and f8 further satisfy −1.46≤f7/f8≤−0.55. The refractive powers of the seventh lens and the eighth lens are reasonably distributed, so that the aberration of the system is improved, and the imaging definition is improved.

In one implementation mode, the optical imaging lens of the disclosure satisfies the condition expression 0.5<f/f1<1.0, wherein f is the total effective focal length of an optical imaging lens and f1 is an effective focal length of the first lens. More specifically, f and f1 further satisfy 0.52≤f/f1≤0.87. Proper control of the refractive power of the first lens helps to relieve aberration, reduce the overall system length, and increase the back focal length of the system.

In one implementation mode, the optical imaging lens of the disclosure satisfies the condition expression |f/f2|+|f/f3|+|f/f6|<1.5, wherein f is the total effective focal length of an optical imaging lens, f2 is an effective focal length of the second lens, f3 is an effective focal length of the third lens, and f6 is an effective focal length of the sixth lens. More specifically, f, f2, f3, and f6 further satisfy 0.2<|f/f2|+|f/f3|+|f/f6|<1.5, for example 0.49≤|f/f2|+|f/f3|+|f/f6|≤1.32. The effective focal lengths of the second lens, the third lens and the sixth lens are reasonably adjusted, so that the refractive power of the optical imaging lens can be more reasonably distributed without being overly concentrated on the seventh lens and the eighth lens, the imaging quality of the system is improved, the sensitivity of the system is reduced, and the miniaturization characteristic of the lens can be maintained.

In one implementation mode, the optical imaging lens of the disclosure satisfies the Condition expression 0.8<DT31/DT62<1.0, wherein DT31 is a curvature radius of the object side surface of the third lens and DT62 is a curvature radius of an image side surface of the sixth lens. More specifically, DT31 and DT62 further satisfy 0.83≤DT31/DT62≤0.93. By reasonably controlling the effective radius of the object side surface of the third lens and the effective radius of the image side surface of the sixth lens, the assembling difficulty of the imaging lens can be effectively reduced, the off-axis aberration correcting capability of the system can be improved, and high image quality is realized.

In one implementation mode, the optical imaging lens of the disclosure satisfies the condition expression (CT3+CT4+CT5+CT6)/4<0.35, wherein CT3 is a center thickness along the optical axis of the third lens, CT4 is a center thickness along the optical axis of the fourth lens, and CT5 is a center thickness along the optical axis of the fifth lens, and CT6 is a center thickness along the optical axis of the sixth lens. More specifically, CT3, CT4, CT5 and CT6 further satisfy 0.2<(CT3+CT4+CT5+CT6)/4<0.35, for example 0.27≤(CT3+CT4+CT5+CT6)/4≤0.32. The center thicknesses of the third lens, the fourth lens, the fifth lens and the sixth lens along the optical axis are reasonably distributed, so that enough space is reserved among the lenses, and the astigmatism and field curvature correcting capability of the optical imaging lens can be effectively improved.

In one implementation mode, the optical imaging lens of the disclosure satisfies the condition expression ΣAT/TTL<0.3, wherein ΣAT is a sum of spacing distances of any two adjacent lenses of the first lens to the eighth lens along the optical axis, and TTL is a distance of an object side surface of the first lens to an imaging surface of an optical imaging lens along the optical axis. More specifically, the ΣAT and TTL further satisfy 0.2<ΣAT/TTL<0.3, e.g., 0.22≤ΣAT/TTL≤0.27. The reasonable control of SAT and TTL can ensure that the total length of the optical imaging lens is in a reasonable range, meanwhile, the structure of the optical imaging lens is favorably adjusted, and the difficulty of lens processing and assembly is reduced.

In one implementation mode, the optical imaging lens of the disclosure satisfies the condition expression 0.5<R11/R12<3.5, wherein R11 is a curvature radius of an object side surface of the sixth lens and R12 is the curvature radius of the image side surface of the sixth lens. More specifically, R11 and R12 further satisfy 0.7<R11/R12<3.5, for example 0.99≤R11/R12≤3.32. The curvature radius of the object side surface and the image side surface of the sixth lens can be reasonably controlled, the sixth lens can be effectively prevented from being excessively bent, the processing difficulty is reduced, meanwhile, astigmatism and coma between the sixth lens and the front lens can be well balanced, and the imaging quality of the system is improved.

In one implementation mode, the optical imaging lens may further include at least one diaphragm to enhance the imaging quality of the optical imaging lens. Optionally, the diaphragm can be disposed between the object side surface and the first lens.

Alternatively, the optical imaging lens may further include a filter for correcting a color deviation and/or a protective glass for protecting a photosensitive element located on the imaging surface.

The optical imaging lens according to the above-described embodiment of the disclosure may employ a plurality of lenses, e.g. eight lenses as above. The volume of the optical imaging lens can be effectively reduced, the sensitivity of the optical imaging lens is reduced, the process ability of the optical imaging lens is improved, the optical imaging lens is more beneficial to production and processing, and the optical imaging lens is applicable to portable electronic products. The optical imaging lens with the configuration can also have the beneficial effects of large aperture, low cost, high imaging quality and the like.

In an embodiment of the disclosure, at least one of the mirror surfaces of each lens is an aspheric mirror surface, that is, at least one of the object side surface and the image side surface of each of the first lens, the second lens, the third lens, the fourth lens, the fifth lens, the sixth lens, the seventh lens, and the eighth lens is aspherical surface. The aspherical lens is wherein: the curvature varies continuously from the center of the lens to the periphery of the lens. Unlike a spherical lens having a constant curvature from the center of the lens to the periphery of the lens, an aspherical lens has better curvature radius characteristics, and has the advantages of improving distortion and improving astigmatic aberration. By adopting the aspheric lens, the aberration occurring during imaging can be eliminated as much as possible, thereby improving the imaging quality. Alternatively, both the object side surface and the image side surface of each of the first lens, the second lens, the third lens, the fourth lens, the fifth lens, the sixth lens, the seventh lens, and the eighth lens are aspherical surface.

However, those skilled in the art should understand that without departing from the technical solution described in the disclosure, the number of lenses constituting the optical imaging lens can be changed to obtain the various results and advantages described in this specification. For example, although eight lenses are described as examples in the embodiment, the optical imaging lens is not limited to including eight lenses. The optical imaging lens may also include other numbers of lenses, if desired.

Specific embodiments of the optical imaging lens applicable to the above-described embodiments are further described below with reference to the accompanying drawings.

Embodiment 1

An optical imaging lens according to Embodiment 1 of the disclosure is described below with reference to FIGS. 1 to 2D. FIG. 1 shows a schematic structural diagram of an optical imaging lens according to Embodiment 1 of the disclosure;

As shown in FIG. 1, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 1 shows the surface types, curvature radius, thickness, materials, and conic coefficient of each lens of the optical imaging lens of Embodiment 1, wherein the curvature radius and thickness are in millimeters (mm).

of the aspheric surface, c=1/R (that is, the paraxial curvature c is the reciprocal of the curvature radius R in Table 1 above); k is the conic coefficient (given in Table 1); and Ai is the correction coefficient of the i-th order of the aspheric surface. The higher order term coefficients $A_4$, $A_6$, $A_8$, $A_{10}$, $A_{12}$, $A_{14}$, $A_{16}$, $A_{18}$, and $A_{20}$ that can be used for each aspherical mirror S1-S16 in Embodiment 1 are given in Table 2 below.

TABLE 2

| Surface Number | A4 | A6 | A8 | A10 | A12 | A14 | A16 | A18 | A20 |
|---|---|---|---|---|---|---|---|---|---|
| S1 | 2.9386E−02 | 1.9725E−02 | −6.6453E−02 | 1.2639E−01 | −1.6452E−01 | 1.3747E−01 | −7.0465E−02 | 1.9452E−02 | −2.1997E−03 |
| S2 | 2.2787E−02 | −1.8981E−02 | −1.4197E−01 | 2.0846E−01 | −9.7579E−02 | −2.5091E−02 | 4.5191E−02 | −1.7791E−02 | 2.4304E−03 |
| S3 | 2.7926E−03 | 1.3029E−01 | −7.2379E−01 | 1.2969E+00 | −1.1624E+00 | 5.3798E−01 | −8.4444E−02 | −2.2503E−02 | 7.6603E−03 |
| S4 | −3.4358E−02 | −9.3274E−02 | 7.0714E−01 | −3.0571E+00 | 6.7005E+00 | −8.1903E+00 | 5.6960E+00 | −2.0976E+00 | 3.1653E−01 |
| S5 | 3.1585E−01 | −1.3711E+00 | 4.1678E+00 | −9.5537E+00 | 1.4657E+01 | −1.4632E+01 | 9.1450E+00 | −3.2174E+00 | 4.8184E−01 |
| S6 | −1.5971E−01 | 4.9648E−01 | −1.6868E+00 | 3.8422E+00 | −6.4452E+00 | 7.1826E+00 | 4.8230E+00 | 1.7746E+00 | −2.7755E−01 |
| S7 | −1.5236E−01 | 2.0318E−01 | −5.7190E−01 | 1.7720E+00 | −4.0287E+00 | 5.2639E+00 | −3.8085E+00 | 1.4310E+00 | −2.1727E−01 |
| S8 | −2.4693E−01 | 4.0081E−01 | 2.9457E−01 | −2.0660E+00 | 3.6070E+00 | −3.7249E+00 | 2.4420E+00 | −9.2518E−01 | 1.5328E−01 |
| S9 | −2.7471E−01 | 1.3627E+00 | −2.8588E+00 | 3.7805E+00 | −3.6493E+00 | 2.5751E+00 | −1.2698E+00 | 4.0058E−01 | −6.1490E−02 |
| S10 | −1.9885E−01 | 1.5530E+00 | −3.9844E+00 | 5.9470E+00 | −5.7446E+00 | 3.6180E+00 | −1.4309E+00 | 3.2088E−01 | −3.0880E−02 |
| S11 | −3.5526E−01 | 1.2980E+00 | −3.2860E+00 | 5.6135E+00 | −6.6268E+00 | 5.2438E+00 | −2.6337E+00 | 7.5143E−01 | −9.1788E−02 |
| S12 | −2.0294E−01 | 2.2929E−01 | 4.5260E−01 | 8.3699E−01 | −1.1625E+00 | 1.0484E+00 | −5.7026E−01 | 1.6903E−01 | −2.0776E−02 |
| S13 | 1.6508E−01 | −5.0796E−01 | 7.0239E−01 | −7.7423E−01 | 5.3222E−01 | −2.1429E−01 | 4.8777E−02 | −5.4978E−03 | 2.0886E−04 |
| S14 | 9.6097E−02 | −5.1870E−02 | −8.3246E−02 | 1.0659E−01 | −5.2841E−02 | 1.2734E−02 | −1.2196E−03 | −3.8717E−05 | 1.0956E−05 |
| S15 | −5.0975E−01 | 4.9060E−01 | −3.1421E−01 | 1.7335E−01 | −7.6037E−02 | 2.2451E−02 | −4.0227E−03 | 3.9218E−04 | −1.5924E−05 |
| S16 | −2.7091E−01 | 2.5652E−01 | −1.7652E−01 | 8.3431E−02 | −2.5945E−02 | 5.1713E−03 | −6.3355E−04 | 4.3261E−05 | −1.2553E−06 |

TABLE 1

| Surface Number | Surface types | Curvature radius | Thickness | Materials Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 1.7750 | 0.7324 | 1.547 | 56.1 | −1.6208 |
| S2 | Aspherical | 5.8082 | 0.1230 | | | −25.9026 |
| S3 | Aspherical | 7.1347 | 0.2030 | 1.668 | 20.4 | −5.3966 |
| S4 | Aspherical | 3.1416 | 0.1764 | | | 5.0932 |
| S5 | Aspherical | 2.1912 | 0.2794 | 1.547 | 56.1 | −47.3025 |
| S6 | Aspherical | 2.5425 | 0.1273 | | | −11.3986 |
| S7 | Aspherical | 4.1237 | 0.3732 | 1.547 | 56.1 | −2.2655 |
| S8 | Aspherical | −12.4626 | 0.0994 | | | 82.8175 |
| S9 | Aspherical | −2.5690 | 0.2040 | 1.658 | 21.5 | −10.4083 |
| S10 | Aspherical | −5.2418 | 0.1217 | | | 11.7368 |
| S11 | Aspherical | 5.3723 | 0.3271 | 1.658 | 21.5 | −2.7705 |
| S12 | Aspherical | 3.0068 | 0.1064 | | | −99.0000 |
| S13 | Aspherical | 1.5759 | 0.5339 | 1.621 | 25.9 | −18.7997 |
| S14 | Aspherical | 4.6571 | 0.4181 | | | −15.6813 |
| S15 | Aspherical | 3.6334 | 0.2791 | 1.537 | 55.7 | −2.0765 |
| S16 | Aspherical | 1.3026 | 0.1741 | | | −6.5798 |
| S17 | Spherical | Infinity | 0.1100 | 1.517 | 64.2 | |
| S18 | Spherical | Infinity | 0.3571 | | | |
| S19 | Spherical | Infinity | | | | |

It can be seen from table 1, both the object side surface and the image side surface of any one of the first lens E1 to the eighth lens E8 are aspheric surfaces. In this embodiment, the profile x of each aspherical lens can be defined using, but not limited to, the following aspherical formula:

$$x = \frac{ch^2}{1+\sqrt{1-(k+1)c^2h^2}} + \sum Aih^i \quad (1)$$

wherein, x is a distance vector height from a vertex of the aspheric surface when the aspheric surface is at a height of h along the optical axis direction; c is the paraxial curvature Table 3 gives an effective focal lengths f1 to f8 of each lens in Embodiment 1, the total effective focal length f of the optical imaging lens, and the total optical length TTL (i.e., a distance along the optical axis between an object side surface S1 of the first lens EI and the imaging surface S19).

TABLE 3

| f1 (mm) | 4.40 | f6 (mm) | −10.98 |
|---|---|---|---|
| f2 (mm) | −8.58 | f7 (mm) | 3.60 |
| f3 (mm) | 22.65 | f8 (mm) | −3.94 |
| f4 (mm) | 5.72 | f(mm) | 3.57 |
| f5 (mm) | −7.90 | TTL (mm) | 4.75 |

Figure 2A:
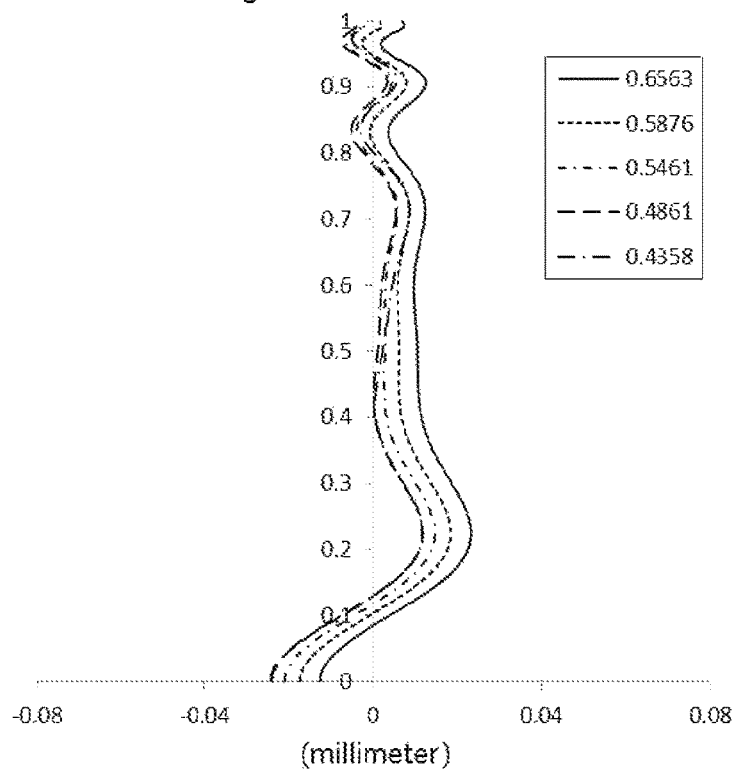
FIGS. 2A to 2D show a longitudinal aberration curve, an astigmatism curve, a distortion curve and a lateral color curve of the optical imaging lens of Embodiment 1, respectively.
Figure 2B:
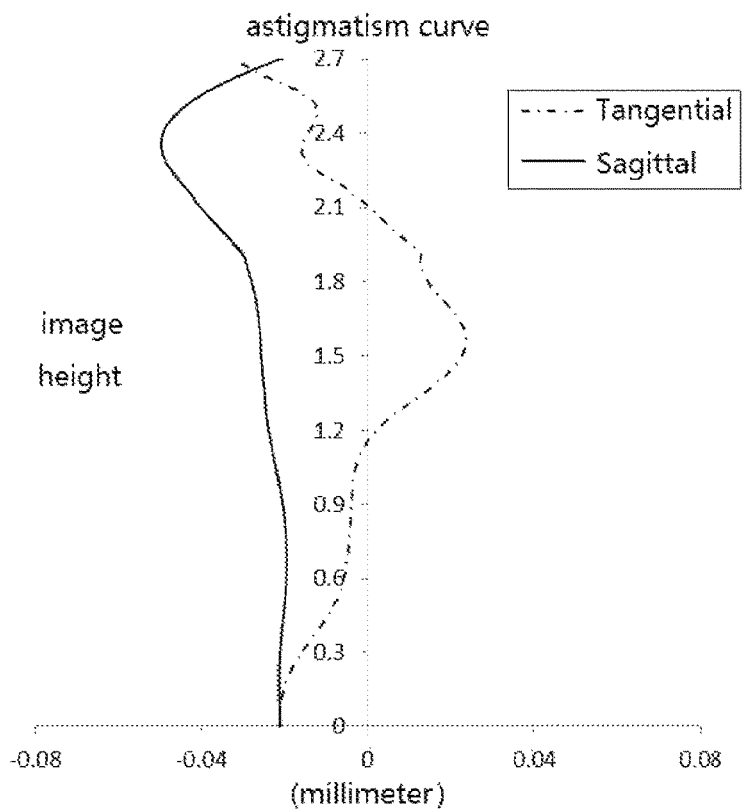
Figure 2C:
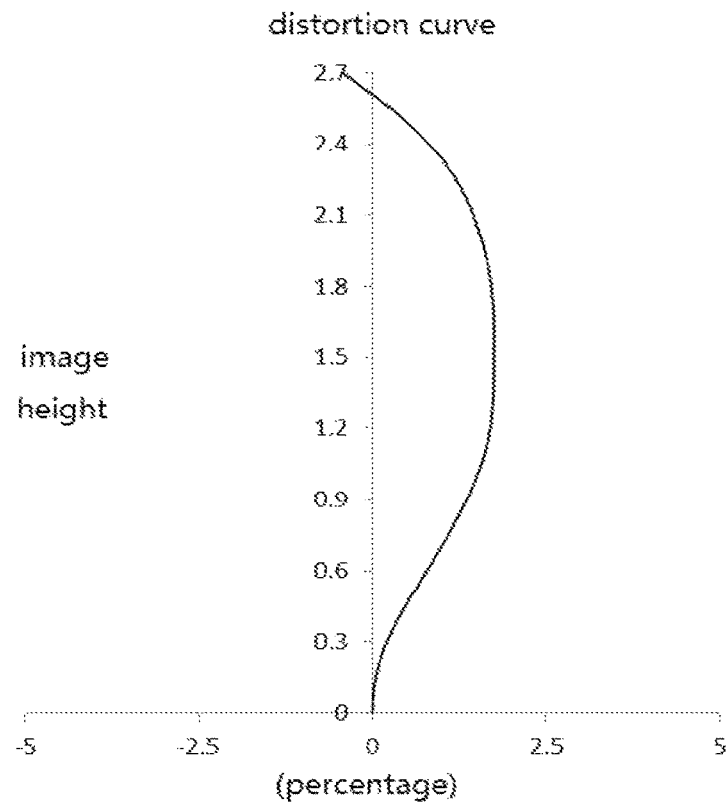
Figure 2D:
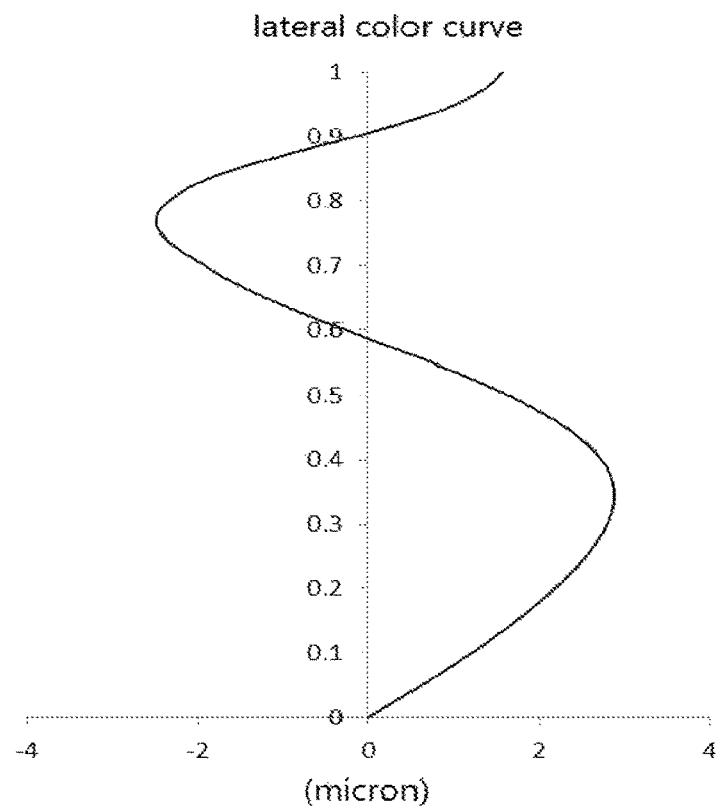

FIG. 2A shows a longitudinal aberration curve of the optical imaging lens of Embodiment 1, which indicates the deviations of light of different wavelengths from a convergent focus point after passing through the lens. FIG. 2B shows an astigmatism curve of the optical imaging lens of Embodiment 1, which indicates a tangential image plane curvature and a sagittal image plane curvature. FIG. 2C shows a distortion curve of the optical imaging lens of Embodiment 1, which indicates a distortion value under different image heights. FIG. 2D shows the lateral color curve of the optical imaging lens of Embodiment 1, which indicates the deviation of different image heights on the imaging surface of light passing through the lens. It can be seen from FIGS. 2A to 2D that, the optical imaging lens provided in Embodiment 1 can achieve good imaging quality.

Embodiment 2

Figure 3:
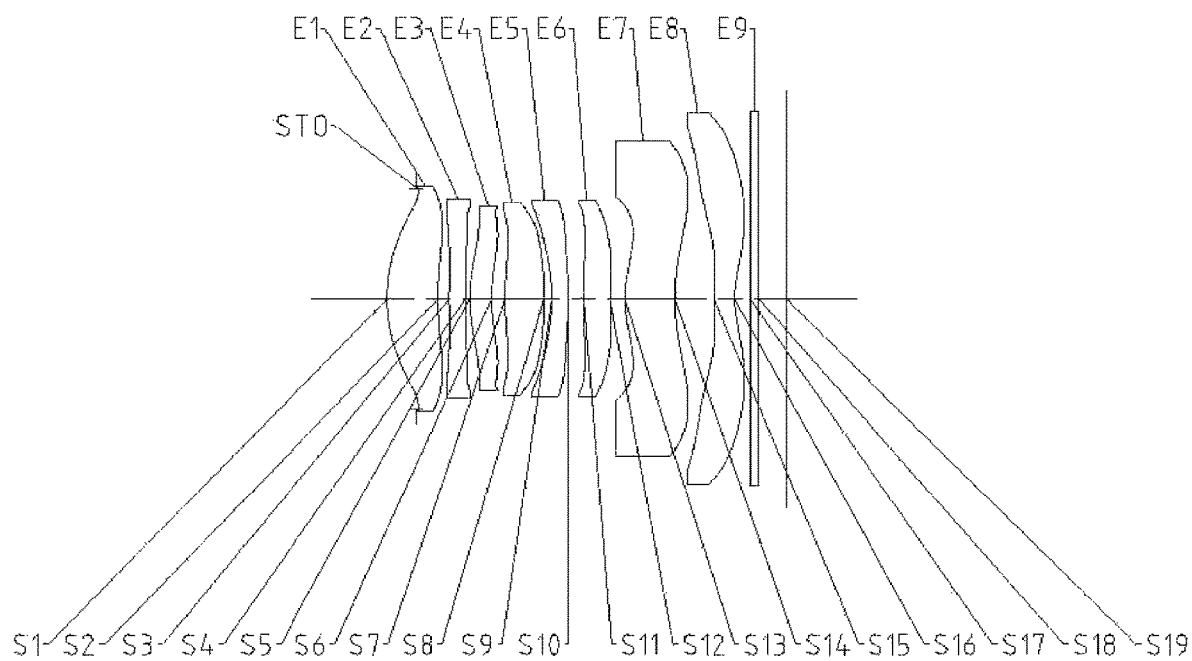
FIG. 3 shows a schematic view showing a structure of an optical imaging lens according to Embodiment 2 of the disclosure.

An optical imaging lens according to Embodiment 2 of the disclosure is described below with reference to FIGS. 3 to 4D. In this embodiment and the following embodiments, a description similar to that of Embodiment 1 will be omitted for the sake of brevity. FIG. 3 is a schematic view showing a structure of an optical imaging lens according to Embodiment 2 of the disclosure.

As shown in FIG. 3, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 4 shows the surface types, curvature radius, thickness, materials, and conic coefficient of each lens of the optical imaging lens of Embodiment 2, wherein the curvature radius and thickness are in millimeters (mm).

TABLE 4

| Surface Number | Surface types | Curvature radius | Thickness | Materials Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 2.0764 | 0.6259 | 1.547 | 56.1 | −2.6508 |
| S2 | Aspherical | 4.8015 | 0.1383 | | | −47.0275 |
| S3 | Aspherical | −584.4666 | 0.2000 | 1.668 | 20.4 | 99.0000 |
| S4 | Aspherical | 12.1482 | 0.0522 | | | 93.8075 |
| S5 | Aspherical | 1.9975 | 0.2698 | 1.547 | 56.1 | −43.5408 |
| S6 | Aspherical | 2.2589 | 0.1650 | | | −11.9445 |
| S7 | Aspherical | 3.6787 | 0.4785 | 1.547 | 56.1 | −7.1586 |
| S8 | Aspherical | −12.3083 | 0.0996 | | | 93.5354 |
| S9 | Aspherical | −2.6502 | 0.2000 | 1.658 | 21.5 | −5.6882 |
| S10 | Aspherical | −5.0726 | 0.1982 | | | 9.3740 |
| S11 | Aspherical | 6.6189 | 0.3210 | 1.658 | 21.5 | 5.8221 |
| S12 | Aspherical | 3.5335 | 0.1843 | | | −65.4833 |
| S13 | Aspherical | 1.5137 | 0.6154 | 1.621 | 25.9 | −21.5837 |
| S14 | Aspherical | 3.4591 | 0.4800 | | | −26.2205 |
| S15 | Aspherical | 4.2762 | 0.2520 | 1.537 | 55.7 | −4.3288 |
| S16 | Aspherical | 1.2854 | 0.1925 | | | −7.8234 |
| S17 | Spherical | Infinity | 0.1100 | 1.517 | 64.2 | |
| S18 | Spherical | Infinity | 0.3379 | | | |
| S19 | Spherical | Infinity | | | | |

It can be seen from Table 4 that in Embodiment 2, both the object side surface and the image side surface of any one of the first lens E1 to the eighth lens E8 are aspheric surfaces. Table 5 shows higher order term coefficients that can be used for each aspherical mirror in Embodiment 2, wherein each aspherical surface type can be defined by Equation (1) given in Embodiment 1 above.

TABLE 5

| Surface Number | A4 | A6 | A8 | A10 | A12 | A14 | A16 | A18 | A20 |
|---|---|---|---|---|---|---|---|---|---|
| S1 | 2.5144E−02 | 2.8771E−02 | −1.3603E−01 | 2.8336E−01 | −3.5327E−01 | 2.6772E−01 | −1.2074E−01 | 2.9186E−02 | −2.8771E−03 |
| S2 | 6.4299E−02 | −2.7091E−01 | 5.0319E−01 | −6.8113E−01 | 5.8811E−01 | −3.0758E−01 | 9.1890E−02 | −1.3676E−02 | 6.6797E−04 |
| S3 | 1.0381E−01 | −4.7881E−01 | 9.6007E−01 | −1.2487E+00 | 9.9003E−01 | −4.0703E−01 | 4.2243E−02 | 2.4629E−02 | −6.5028E−03 |
| S4 | 3.5279E−02 | −3.4124E−01 | 1.0363E+00 | −2.0775E+00 | 2.5744E+00 | −1.9136E+00 | 8.1521E−01 | −1.6853E−01 | 9.2139E−03 |
| S5 | 3.6054E−01 | −1.5622E+00 | 4.6434E+00 | −9.5282E+00 | 1.2497E+01 | −1.0482E+01 | 5.5146E+00 | −1.6555E+00 | 2.1416E−01 |
| S6 | −1.2562E−01 | 2.1663E−01 | −4.3579E−01 | 8.8163E−01 | −2.3868E+00 | 3.7675E+00 | −3.0655E+00 | 1.2577E+00 | −2.0896E−01 |
| S7 | −1.6469E−01 | 3.5789E−01 | −1.5273E+00 | 4.8567E+00 | −9.8649E+00 | 1.1903E+01 | −8.2517E+00 | 3.0429E+00 | −4.6286E−01 |
| S8 | −2.3783E−01 | 9.8711E−02 | 1.2479E+00 | −3.4267E+00 | 4.0218E+00 | −2.5097E+00 | 8.3748E−01 | −1.3158E−01 | 6.5758E−03 |
| S9 | −2.4431E−01 | 1.0180E+00 | −1.7352E+00 | 1.7984E+00 | −1.7688E+00 | 1.7111E+00 | −1.1453E+00 | 4.2062E−01 | −6.3928E−02 |
| S10 | −1.3133E−01 | 1.2105E+00 | −3.0329E+00 | 4.2703E+00 | −3.8822E+00 | 2.3266E+00 | −8.8267E−01 | 1.8975E−01 | −1.7374E−02 |
| S11 | −3.5357E−01 | 1.1334E+00 | −2.2825E+00 | 2.9219E+00 | −2.4201E+00 | 1.2157E+00 | −3.1555E−01 | 1.8019E−02 | 5.7950E−03 |

TABLE 5-continued

| Surface Number | A4 | A6 | A8 | A10 | A12 | A14 | A16 | A18 | A20 |
|---|---|---|---|---|---|---|---|---|---|
| S12 | −4.8605E−01 | 1.0590E+00 | −1.9480E+00 | 2.7723E+00 | −2.9083E+00 | 2.1186E+00 | −9.9863E−01 | 2.7033E−01 | −3.1428E−02 |
| S13 | 1.8218E−01 | −8.1449E−01 | 1.4531E+00 | −1.7900E+00 | 1.4098E+00 | −6.7687E−01 | 1.8073E−01 | −2.0966E−02 | 2.2460E−04 |
| S14 | 1.4239E−01 | −2.3711E−01 | 2.0488E−01 | −1.3173E−01 | 6.3488E−02 | −2.1287E−02 | 4.5111E−03 | −5.3310E−04 | 2.6538E−05 |
| S15 | −5.0464E−01 | 5.8645E−01 | −4.2408E−01 | 2.0986E−01 | −6.9842E−02 | 1.5012E−02 | −1.9694E−03 | 1.4174E−04 | −4.2377E−06 |
| S16 | −2.6366E−01 | 2.5782E−01 | −1.6603E−01 | 6.9605E−02 | −1.9012E−02 | 3.3499E−03 | −3.6675E−04 | 2.2629E−05 | −5.9838E−07 |

Table 6 shows an effective focal lengths f1 to f8 of each lens in Embodiment 2, a total effective focal length f of the optical imaging lens, and a total optical length TTL.

TABLE 6

| f1 (mm) | 6.19 | f6 (mm) | −12.01 |
|---|---|---|---|
| f2 (mm) | −17.83 | f7 (mm) | 3.87 |
| f3 (mm) | 23.15 | f8 (mm) | −3.52 |
| f4 (mm) | 5.24 | f(mm) | 3.52 |
| f5 (mm) | −8.72 | TTL (mm) | 4.92 |

Figure 4A:
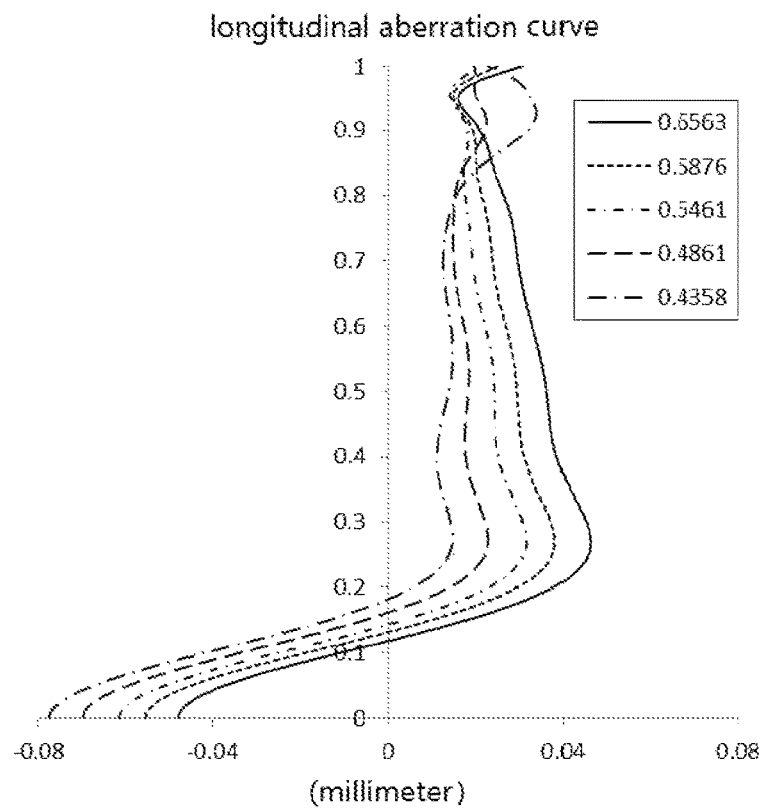
FIGS. 4A to 4D show a longitudinal aberration curve, an astigmatism curve, a distortion curve, and a lateral color curve of the optical imaging lens of Embodiment 2, respectively.
Figure 4B:
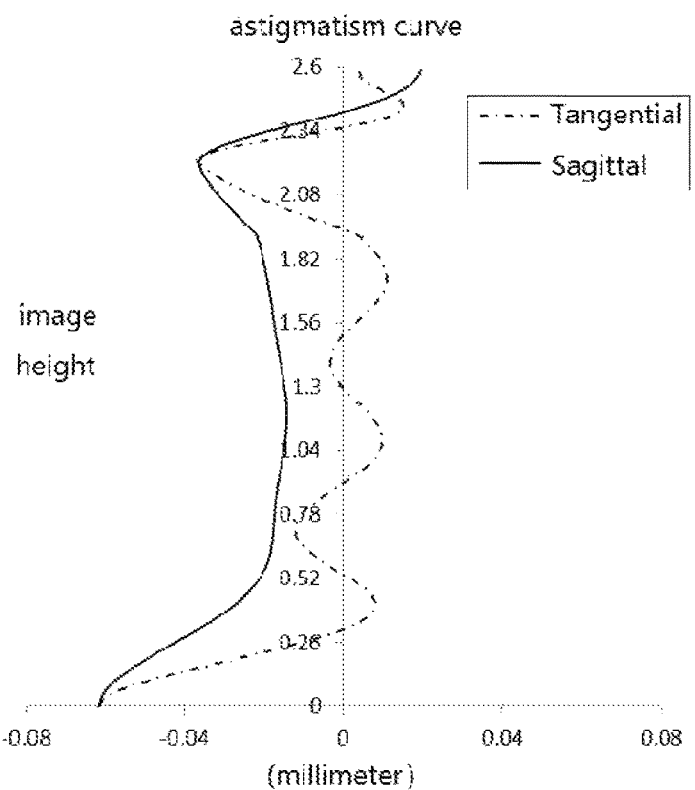
Figure 4C:
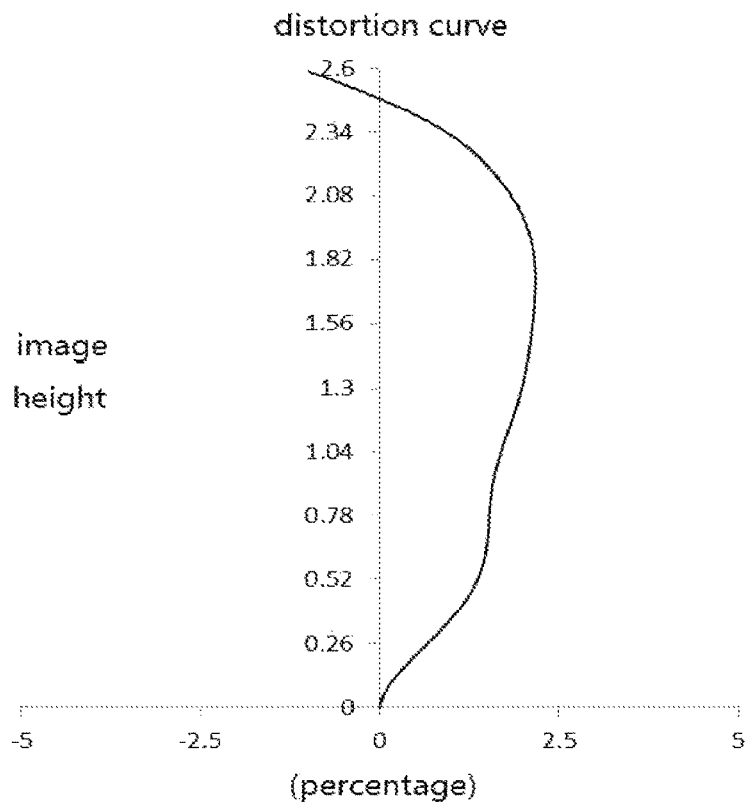
Figure 4D:
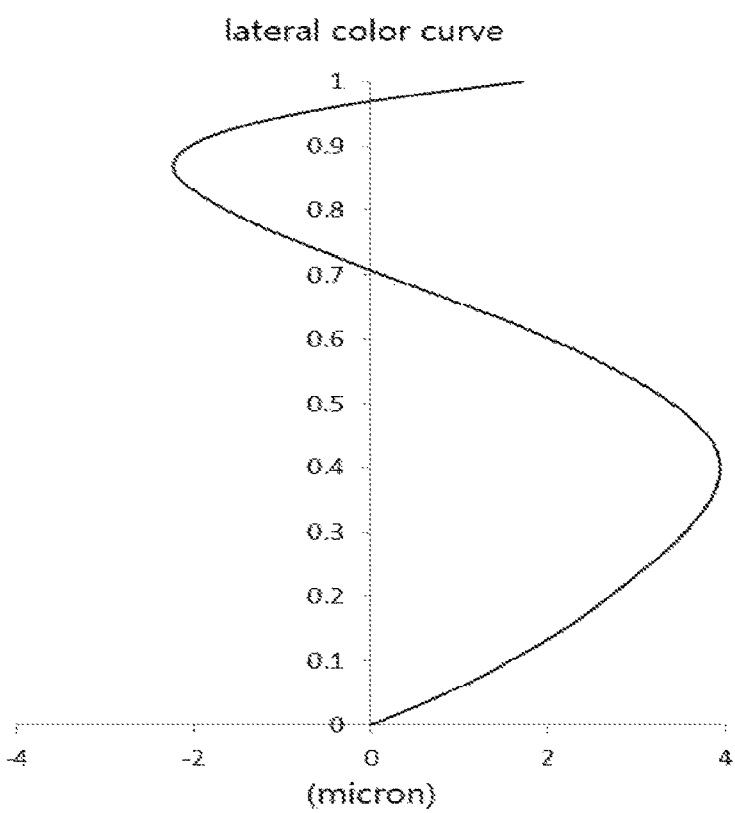

FIG. 4A shows a longitudinal aberration curve of the optical imaging lens of Embodiment 2, which indicates the deviations of light of different wavelengths from a convergent focus point after passing through the lens. FIG. 4B shows an astigmatism curve of the optical imaging lens of Embodiment 2, which indicates a tangential image plane curvature and a sagittal image plane curvature. FIG. 4C shows a distortion curve of the optical imaging lens of Embodiment 2, which indicates a distortion value under different image heights. FIG. 4D shows the lateral color curve of the optical imaging lens of Embodiment 2, which indicates the deviation of different image heights on the imaging surface of light passing through the lens. It can be seen from FIGS. 4A to 4D that in Embodiment 2, the optical imaging lens provided in Embodiment 2 can achieve good imaging quality.

Embodiment 3

Figure 5:
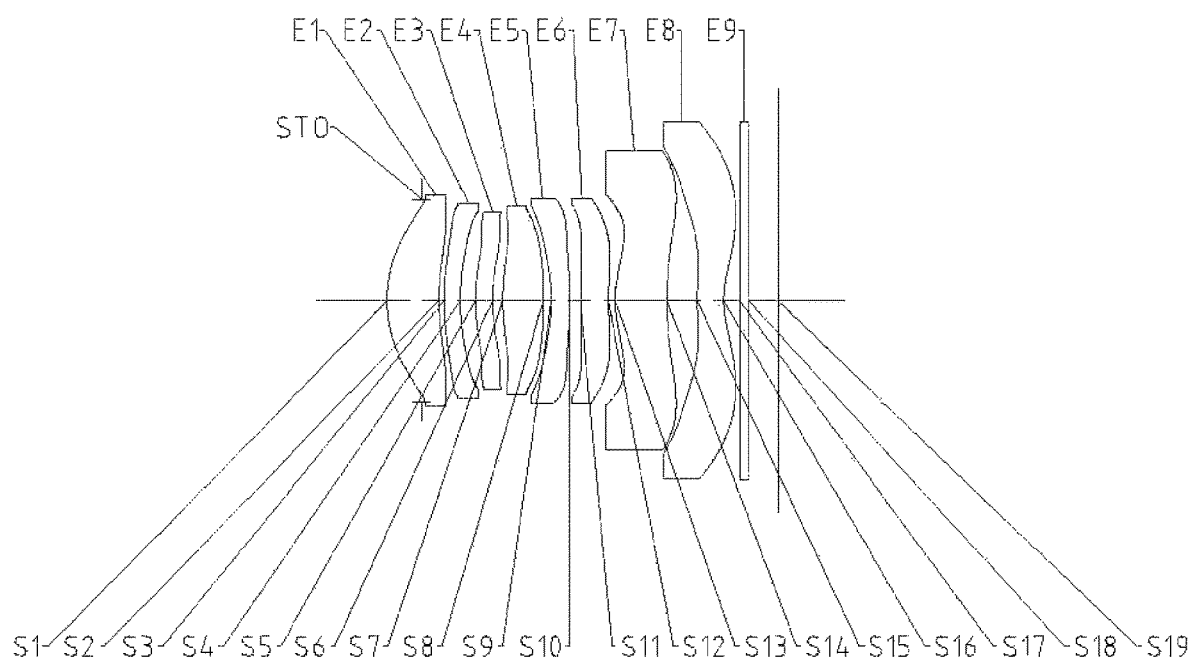
FIG. 5 shows a schematic view showing a structure of an optical imaging lens according to Embodiment 3 of the disclosure.

An optical imaging lens according to Embodiment 3 of the disclosure is described below with reference to FIGS. 5 to 6D. FIG. 5 is a schematic view showing a structure of an optical imaging lens according to Embodiment 3 of the disclosure.

As shown in FIG. 5, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a positive refractive power, an object side surface S3 of the second lens is a convex surface and an image side surface S4 of the second lens is a concave surface. The third lens E3 has a negative refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 7 shows the surface types, curvature radius, thickness, materials, and conic coefficient of each lens of the optical imaging lens of Embodiment 3, wherein the curvature radius and thickness are in millimeters (mm).

TABLE 7

| Surface Number | Surface types | Curvature radius | Thickness | Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 1.7596 | 0.6330 | 1.547 | 56.1 | −1.7991 |
| S2 | Aspherical | 2.8800 | 0.0652 | | | −28.7555 |
| S3 | Aspherical | 3.1986 | 0.2001 | 1.668 | 20.4 | −14.8124 |
| S4 | Aspherical | 3.1562 | 0.1835 | | | 4.8034 |
| S5 | Aspherical | 2.2224 | 0.2112 | 1.547 | 56.1 | −67.4680 |
| S6 | Aspherical | 1.9911 | 0.1241 | | | −10.2099 |
| S7 | Aspherical | 2.8656 | 0.5016 | 1.547 | 56.1 | −1.9032 |
| S8 | Aspherical | −11.5581 | 0.1004 | | | 82.3097 |
| S9 | Aspherical | −2.5317 | 0.2251 | 1.658 | 21.5 | −8.0647 |
| S10 | Aspherical | −5.2274 | 0.1338 | | | 11.7907 |
| S11 | Aspherical | 6.8847 | 0.3461 | 1.658 | 21.5 | 0.5389 |
| S12 | Aspherical | 2.0726 | 0.0859 | | | −87.0978 |

TABLE 7-continued

| Surface Number | Surface types | Curvature radius | Thickness | Materials Refractive index | Abbe number | Conic coefficient |
|---|---|---|---|---|---|---|
| S13 | Aspherical | 1.3511 | 0.6368 | 1.621 | 25.9 | −25.9175 |
| S14 | Aspherical | 5.9534 | 0.3713 | | | −25.1478 |
| S15 | Aspherical | 3.3358 | 0.3251 | 1.537 | 55.7 | −13.9119 |
| S16 | Aspherical | 1.3185 | 0.1964 | | | −6.6397 |
| S17 | Spherical | Infinity | 0.1100 | 1.517 | 64.2 | |
| S18 | Spherical | Infinity | 0.3604 | | | |
| S19 | Spherical | Infinity | | | | |

It can be seen from Table 7 that in Embodiment 3, both the object side surface and the image side surface of any one of the first lens E1 to the eighth lens E8 are aspheric surfaces. Table 8 shows higher order term coefficients that can be used for each aspherical mirror in Embodiment 3, wherein each aspherical surface type can be defined by Equation (1) given in Embodiment 1 above.

curve of the optical imaging lens of Embodiment 3, which indicates the deviation of different image heights on the imaging surface of light passing through the lens. It can be seen from FIGS. 6A to 6D that, the optical imaging lens provided in Embodiment 3 can achieve good imaging quality.

TABLE 8

| Surface Number | A4 | A6 | A8 | A10 | A12 | A14 | A16 | A18 | A20 |
|---|---|---|---|---|---|---|---|---|---|
| S1 | 4.4219E−02 | −8.6349E−02 | 3.2577E−01 | −7.3139E−01 | 9.9168E−01 | −8.3027E−01 | 4.1798E−01 | −1.1681E−01 | 1.3946E−02 |
| S2 | −8.0925E−04 | 1.4955E−01 | −7.6867E−01 | 1.4873E+00 | −1.6375E+00 | 1.1006E+00 | −4.4645E−01 | 1.0023E−01 | −9.5440E−03 |
| S3 | −1.1965E−01 | 5.9150E−01 | −1.7256E+00 | 2.7858E+00 | −2.6003E+00 | 1.3514E+00 | −3.0585E−01 | −1.3871E−02 | 1.2961E−02 |
| S4 | −9.1233E−02 | 1.4923E−01 | 4.4456E−01 | −3.2100E+00 | 7.5154E+00 | −9.3773E+00 | 6.6189E+00 | −2.4749E+00 | 3.7972E−01 |
| S5 | 3.3497E−01 | −1.5167E+00 | 4.8658E+00 | −1.1450E+01 | 1.7997E+01 | −1.8716E+01 | 1.2419E+01 | −4.7086E+00 | 7.6761E−01 |
| S6 | −2.2112E−01 | 7.7056E−01 | −1.7848E+00 | 1.8652E+00 | 8.9129E−03 | −2.8529E+00 | 3.8314E+00 | −2.1684E+00 | 4.6014E−01 |
| S7 | −1.6877E−01 | 3.3297E−01 | −9.1715E−01 | 2.2937E+00 | −4.3330E+00 | 4.8779E+00 | −3.0185E+00 | 9.3518E−01 | −1.0856E−01 |
| S8 | −2.7790E−01 | 7.2073E−01 | −1.3333E+00 | 2.5557E+00 | 4.4743E+00 | 4.9935E+00 | −3.1725E+00 | 1.0543E+00 | −1.4130E−01 |
| S9 | −3.1188E−01 | 1.6630E+00 | 4.3415E+00 | 8.0303E+00 | −1.1070E+01 | 1.0488E+01 | −6.2577E+00 | 2.1026E+00 | −3.0348E−01 |
| S10 | −1.9511E−01 | 1.5805E+00 | −4.0726E+00 | 6.1674E+00 | −6.1150E+00 | 3.9984E+00 | −1.6578E+00 | 3.9229E−01 | −3.9975E−02 |
| S11 | −4.1131E−01 | 1.5965E+00 | −3.9644E+00 | 6.4566E+00 | −7.1797E+00 | 5.3421E+00 | −2.5318E+00 | 6.8600E−01 | −8.0136E−02 |
| S12 | −3.1094E−01 | 5.8496E−01 | −1.0021E+00 | 1.2618E+00 | −1.2432E+00 | 9.0972E−01 | −4.4417E−01 | 1.2548E−01 | −1.5192E−02 |
| S13 | 1.0780E−01 | −4.5623E−01 | 7.6325E−01 | −8.7681E−01 | 5.4457E−01 | −1.4109E−01 | −1.5086E−02 | 1.6059E−02 | −2.4382E−03 |
| S14 | 2.9618E−02 | 3.9894E−02 | −1.1973E−01 | 9.8758E−02 | −4.2716E−02 | 1.0625E−02 | −1.4989E−03 | 1.0721E−04 | −2.7082E−06 |
| S15 | −4.2660E−01 | 4.3008E−01 | −3.1188E−01 | 1.8129E−01 | −7.6154E−02 | 2.0852E−02 | −3.4672E−03 | 3.1630E−04 | −1.2118E−05 |
| S16 | −2.0119E−01 | 1.7196E−01 | −1.1297E−01 | 5.0808E−02 | −1.5170E−02 | 2.9213E−03 | −3.4551E−04 | 2.2678E−05 | −6.2931E−07 |

Table 9 shows an effective focal lengths f1 to f8 of each lens in Embodiment 3, the total effective focal length f of the optical imaging lens, and the total optical length TTL.

TABLE 9

| | | | |
|---|---|---|---|
| f1 (mm) | 6.90 | f6 (mm) | −4.64 |
| f2 (mm) | 401.09 | f7 (mm) | 2.67 |
| f3 (mm) | −51.69 | f8 (mm) | −4.30 |
| f4 (mm) | 4.25 | f (mm) | 3.57 |
| f5 (mm) | −7.72 | TTL (mm) | 4.81 |

Figure 6A:
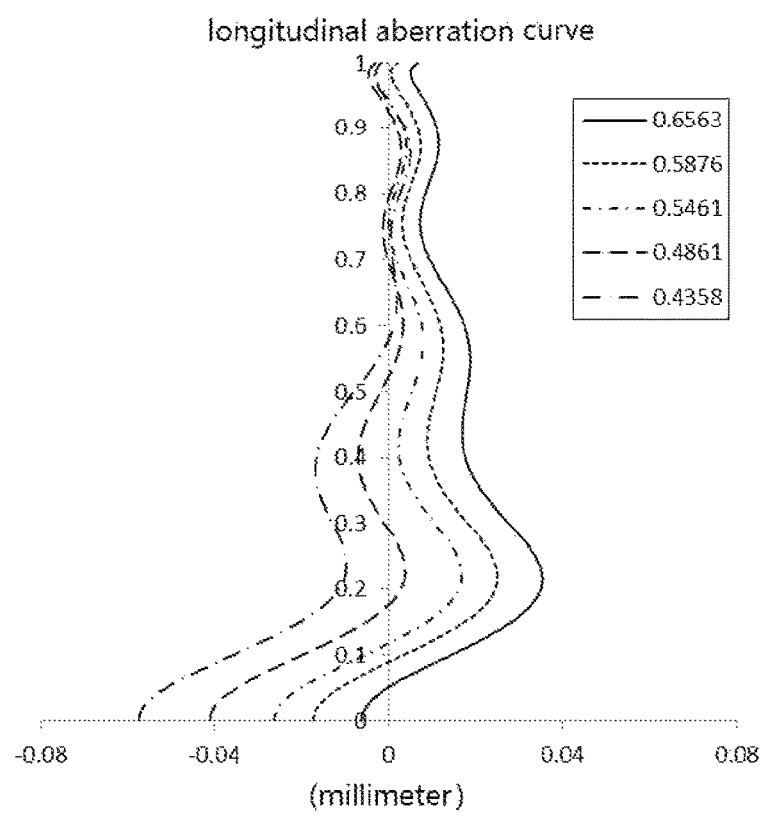
FIGS. 6A to 6D show a longitudinal aberration curve, an astigmatism curve, a distortion curve, and a lateral color curve of the optical imaging lens of Embodiment 3, respectively.
Figure 6B:
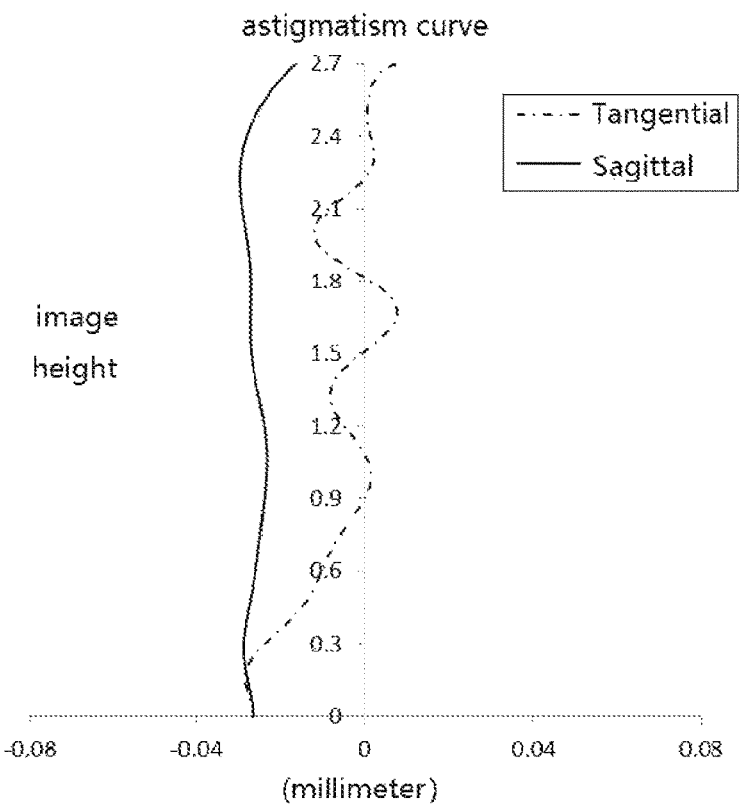
Figure 6C:
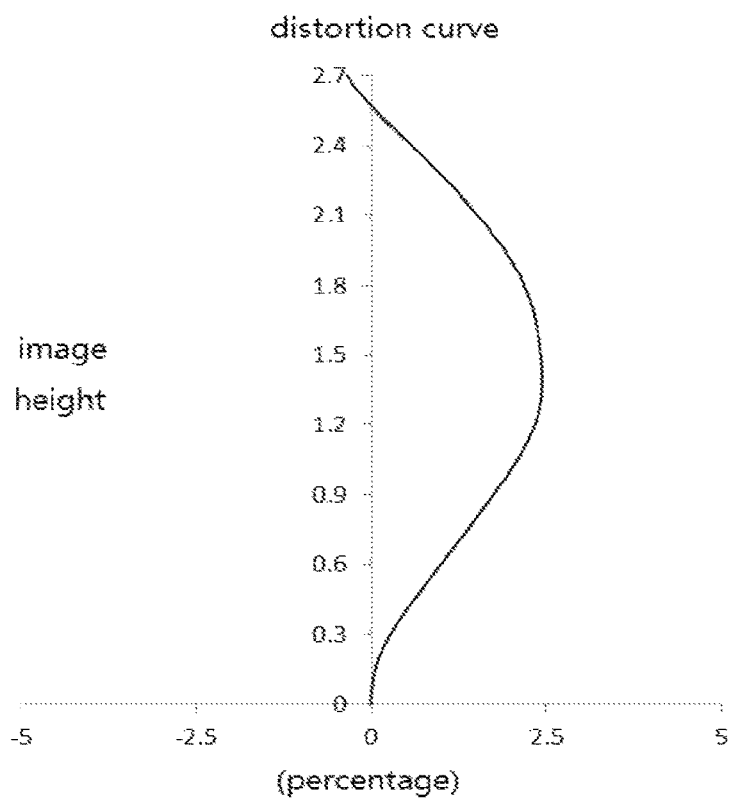
Figure 6D:
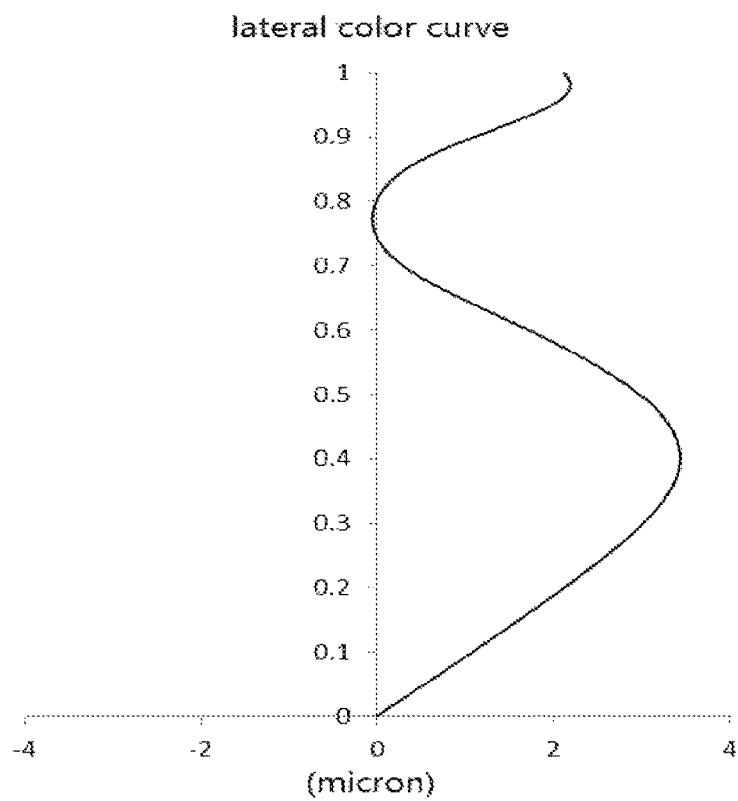

FIG. 6A shows a longitudinal aberration curve of the optical imaging lens of Embodiment 3, which indicates the deviations of light of different wavelengths from a convergent focus point after passing through the lens. FIG. 6B shows an astigmatism curve of the optical imaging lens of Embodiment 3, which indicates a tangential image plane curvature and a sagittal image plane curvature. FIG. 6C shows a distortion curve of the optical imaging lens of Embodiment 3, which indicates a distortion value under different image heights. FIG. 6D shows the lateral color Embodiment 4

Figure 7:
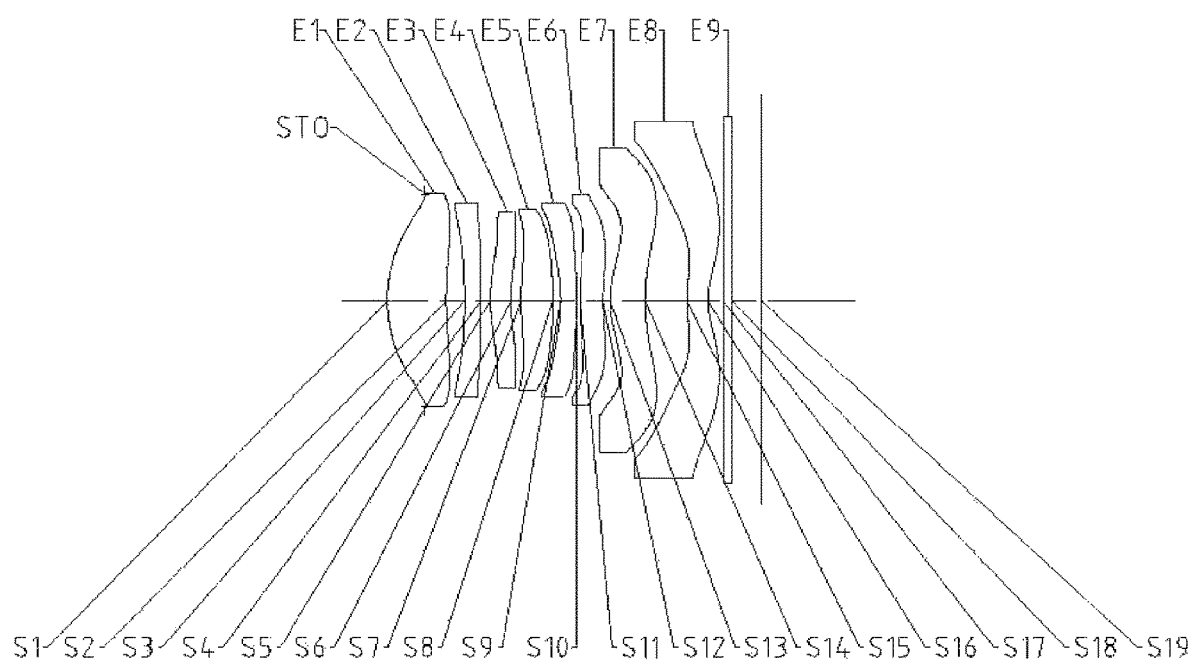
FIG. 7 shows a schematic view showing a structure of an optical imaging lens according to Embodiment 4 of the disclosure.

An optical imaging lens according to Embodiment 4 of the disclosure is described below with reference to FIGS. 7 to 8D. FIG. 7 is a schematic view showing a structure of an optical imaging lens according to Embodiment 4 of the disclosure.

As shown in FIG. 7, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a concave surface and an image side surface S4 of the second lens is a convex surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 10 shows the surface types, curvature radius, thickness, materials, and conic coefficient of each lens of the optical imaging lens of Embodiment 4, wherein the curvature radius and thickness are in millimeters (mm).

TABLE 10

| Surface Number | Surface types | Curvature radius | Thickness | Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 1.8064 | 0.7232 | 1.547 | 56.1 | −1.8475 |
| S2 | Aspherical | 5.7350 | 0.2267 | | | −34.8985 |
| S3 | Aspherical | −7.1391 | 0.2000 | 1.668 | 20.4 | −20.3812 |
| S4 | Aspherical | −488.0000 | 0.1183 | | | −99.0000 |
| S5 | Aspherical | 2.2902 | 0.2519 | 1.547 | 56.1 | −57.9326 |
| S6 | Aspherical | 2.5963 | 0.1252 | | | −11.8858 |
| S7 | Aspherical | 4.1795 | 0.3889 | 1.547 | 56.1 | −3.1557 |
| S8 | Aspherical | −12.1970 | 0.0966 | | | 95.6461 |
| S9 | Aspherical | −2.5638 | 0.2000 | 1.658 | 21.5 | −9.7012 |
| S10 | Aspherical | −5.4318 | 0.0467 | | | 13.2544 |
| S11 | Aspherical | 4.0901 | 0.2799 | 1.658 | 21.5 | −7.1987 |
| S12 | Aspherical | 2.1985 | 0.0896 | | | −58.4366 |
| S13 | Aspherical | 1.2923 | 0.4321 | 1.621 | 25.9 | −16.3844 |
| S14 | Aspherical | 3.1861 | 0.5128 | | | −18.6902 |
| S15 | Aspherical | 1.9887 | 0.2569 | 1.537 | 55.7 | −13.0696 |
| S16 | Aspherical | 1.0352 | 0.1911 | | | −7.0648 |
| S17 | Spherical | Infinity | 0.1100 | 1.517 | 64.2 | |
| S18 | Spherical | Infinity | 0.3601 | | | |
| S19 | Spherical | Infinity | | | | |

It can be seen from Table 10 that both the object side surface and the image side surface of any one of the first lens E1 to the eighth lens E8 are aspheric surfaces. Table 11 shows higher order term coefficients that can be used for each aspherical mirror in Embodiment 4, wherein each aspherical surface type can be defined by Equation (1) given in Embodiment 1 above.

TABLE 11

| Surface Number | A4 | A6 | A8 | A10 | A12 | A14 | A16 | A18 | A20 |
|---|---|---|---|---|---|---|---|---|---|
| S1 | 2.8822E−02 | −9.8287E−04 | 6.3303E−02 | −2.7124E−01 | 4.9975E−01 | −5.0565E−01 | 2.8922E−01 | −8.8091E−02 | 1.1069E−02 |
| S2 | 1.1311E−02 | −4.9029E−02 | 8.7807E−02 | −2.6983E−01 | 4.5232E−01 | −4.3236E−01 | 2.4088E−01 | −7.3100E−02 | 9.3343E−03 |
| S3 | 1.0472E−02 | −1.1174E−02 | −2.2284E−01 | 4.5974E−01 | −3.5519E−01 | 5.4850E−02 | 9.3964E−02 | −6.0404E−02 | 1.1293E−02 |
| S4 | −1.5680E−02 | −9.6233E−02 | 5.0855E−01 | −2.1585E+00 | 5.0841E+00 | −6.7424E+00 | 5.1221E+00 | −2.0846E+00 | 3.5262E−01 |
| S5 | 3.3597E−01 | −1.5112E+00 | 4.3816E+00 | −9.5063E+00 | 1.3831E+01 | −1.2975E+01 | 7.5569E+00 | −2.4700E+00 | 3.4308E−01 |
| S? | −1.7898E−01 | 7.2948E−01 | −2.8464E+00 | 7.1639E+00 | −1.2791E+01 | 1.5146E+01 | −1.0974E+01 | 4.3930E+00 | −7.4337E−01 |
| S7 | −1.3280E−01 | 5.3982E−02 | 1.5092E−01 | −1.0206E−01 | −1.4348E+00 | 3.3373E+00 | −3.1182E+00 | 1.3690E+00 | −2.3301E−01 |
| S8 | −3.4717E−01 | 9.8619E−01 | −1.3336E+00 | 8.0438E−01 | −2.6347E−01 | 3.1979E−01 | −4.2031E−01 | 2.2810E−01 | −4.3576E−02 |
| S9 | −3.4468E−01 | 1.8499E+00 | −3.8712E+00 | 3.9422E+00 | −1.2767E+00 | −1.4263E+00 | 1.7729E+00 | −7.6256E−01 | 1.2024E−01 |
| S10 | −2.1477E−01 | 1.8044E+00 | −4.7535E+00 | 6.8211E+00 | −5.9706E+00 | 3.2412E+00 | −1.0566E+00 | 1.8626E−01 | −1.3125E−02 |
| S11 | −3.2210E−01 | 1.0687E+00 | −2.3211E+00 | 3.1577E+00 | −2.9835E+00 | 1.9755E+00 | −8.5896E−01 | 2.0710E−01 | −1.8831E−02 |
| S12 | −1.6803E−01 | −1.6273E−01 | 1.1061E+00 | −2.3135E+00 | 2.5531E+00 | −1.6218E+00 | 5.8419E−01 | −1.0709E−01 | 7.2760E−03 |
| S13 | 1.7829E−01 | −6.8839E−01 | 1.2744E+00 | −1.6840E+00 | 1.4132E+00 | −7.4871E−01 | 2.4644E−01 | −4.6139E−02 | 3.7538E−03 |
| S14 | 7.5540E−02 | −6.3781E−02 | −4.4582E−02 | 6.7569E−02 | −3.2222E−02 | 6.1184E−03 | 1.8172E−04 | −2.3455E−04 | 2.4659E−05 |
| S15 | −5.3059E−01 | 4.9930E−01 | −4.1686E−01 | 3.2349E−01 | −1.7582E−01 | 5.9054E−02 | −1.1664E−02 | 1.2425E−03 | −5.5072E−05 |
| S16 | −2.2649E−01 | 1.5530E−01 | −8.4005E−02 | 3.3987E−02 | −9.4437E−03 | 1.7082E−03 | −1.8953E−04 | 1.1603E−05 | −2.9844E−07 |

Table 12 shows an effective focal lengths f1 to f8 of each lens in Embodiment 4, the total effective focal length f of the optical imaging lens, and the total optical length TTL.

TABLE 12

| f1 (mm) | 4.53 | f6 (mm) | −7.67 |
|---|---|---|---|
| f2 (mm) | −10.86 | f7 (mm) | 3.22 |
| f3 (mm) | 27.54 | f8 (mm) | −4.44 |
| f4 (mm) | 5.74 | f (mm) | 3.45 |
| f5 (mm) | −7.59 | TTL (mm) | 4.61 |

Figure 8A:
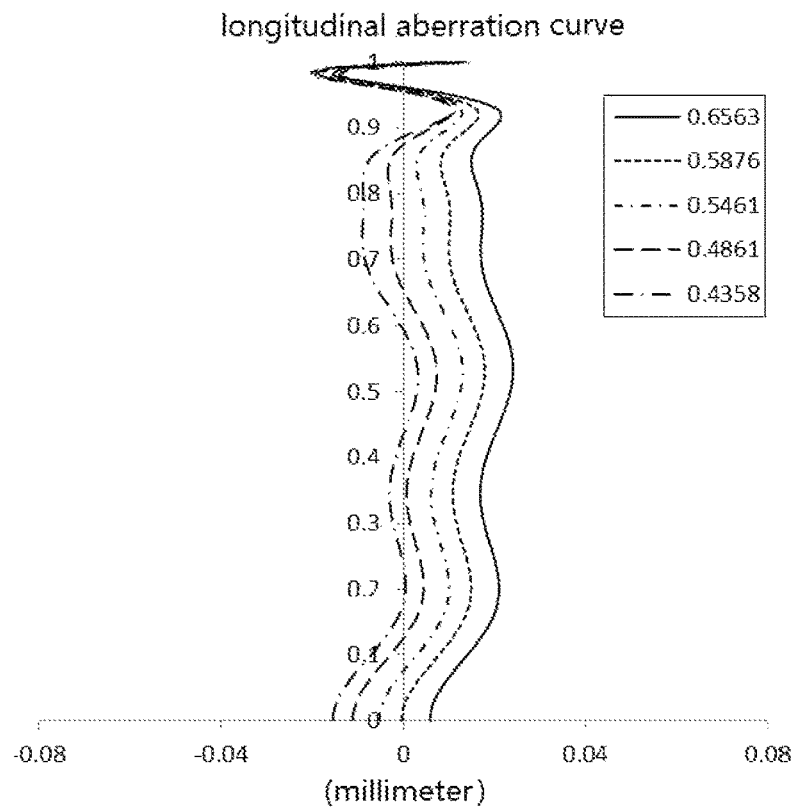
FIGS. 8A to 8D show a longitudinal aberration curve, an astigmatism curve, a distortion curve and a lateral color curve of the optical imaging lens of Embodiment 4, respectively.
Figure 8B:
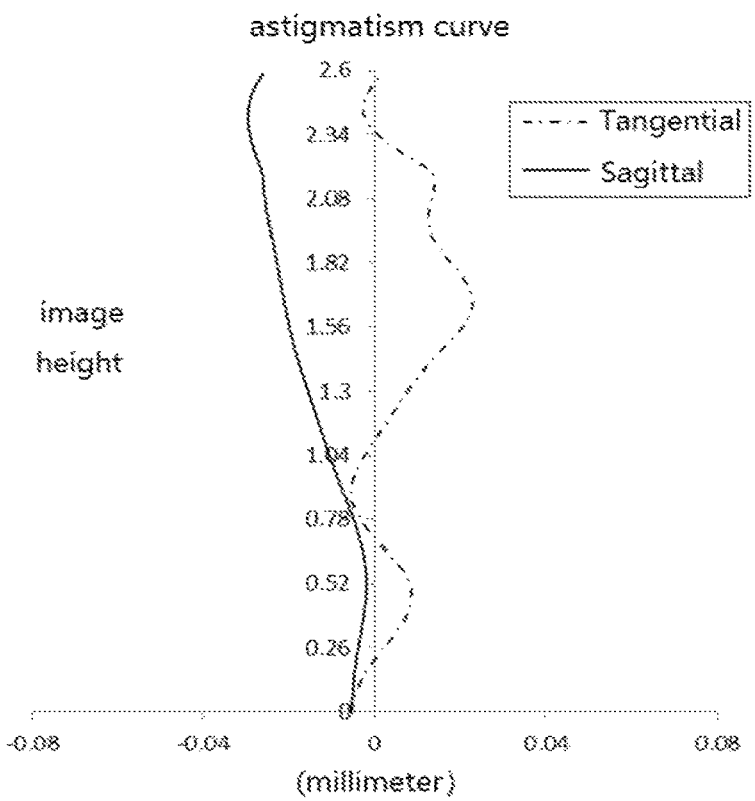
Figure 8C:
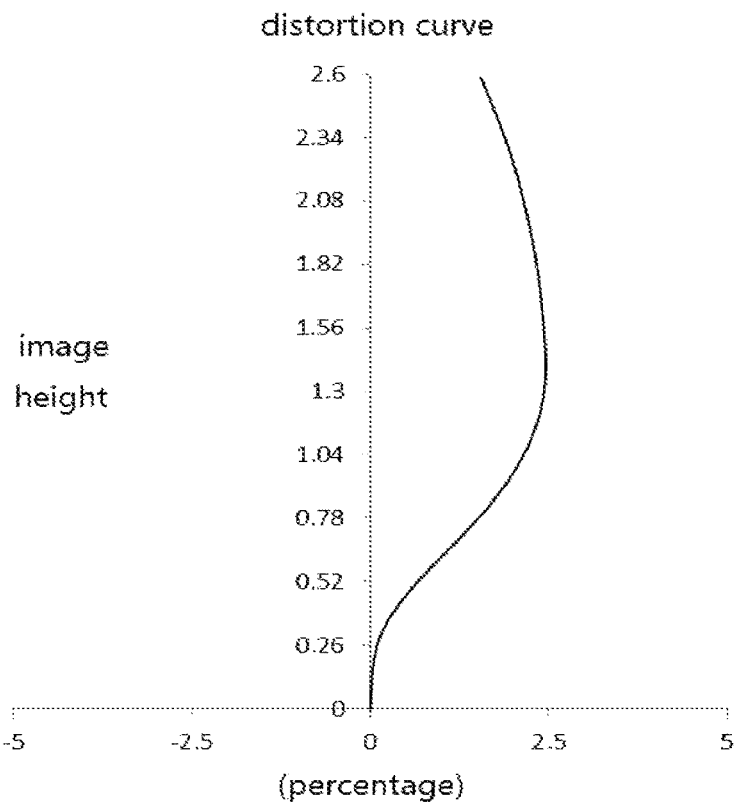
Figure 8D:
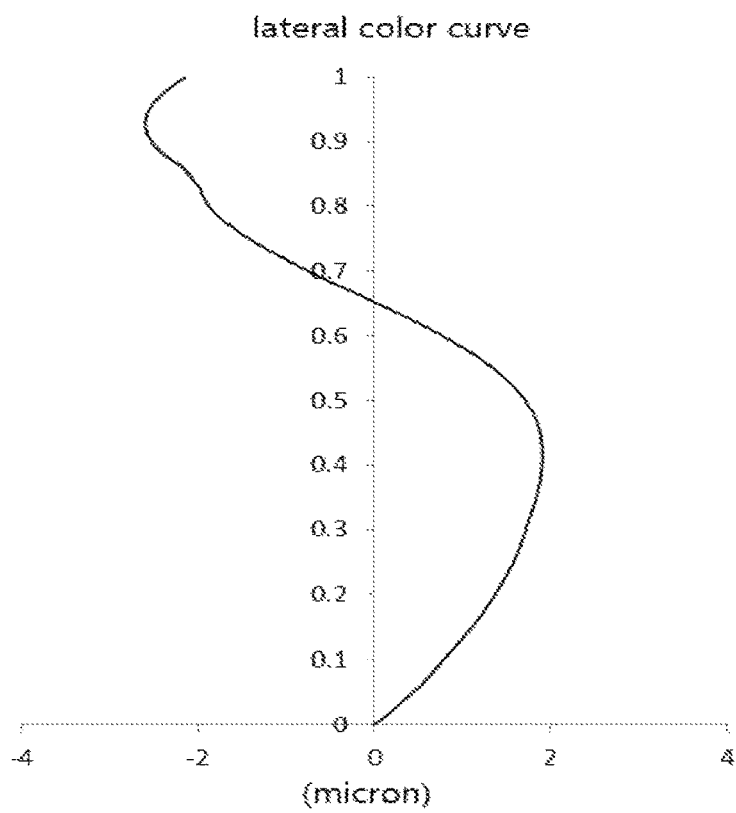

FIG. 8A shows a longitudinal aberration curve of the optical imaging lens of Embodiment 4, which indicates the deviations of light of different wavelengths from a convergent focus point after passing through the lens. FIG. 8B shows an astigmatism curve of the optical imaging lens of Embodiment 4, which indicates a tangential image plane curvature and a sagittal image plane curvature. FIG. 8C shows a distortion curve of the optical imaging lens of Embodiment 4, which indicates a distortion value under different image heights. FIG. 8D shows the lateral color curve of the optical imaging lens of Embodiment 4, which indicates the deviation of different image heights on the imaging surface of light passing through the lens. It can be seen from FIGS. 8A to 8D that, the optical imaging lens provided in Embodiment 4 can achieve good imaging quality.

Embodiment 5

Figure 9:
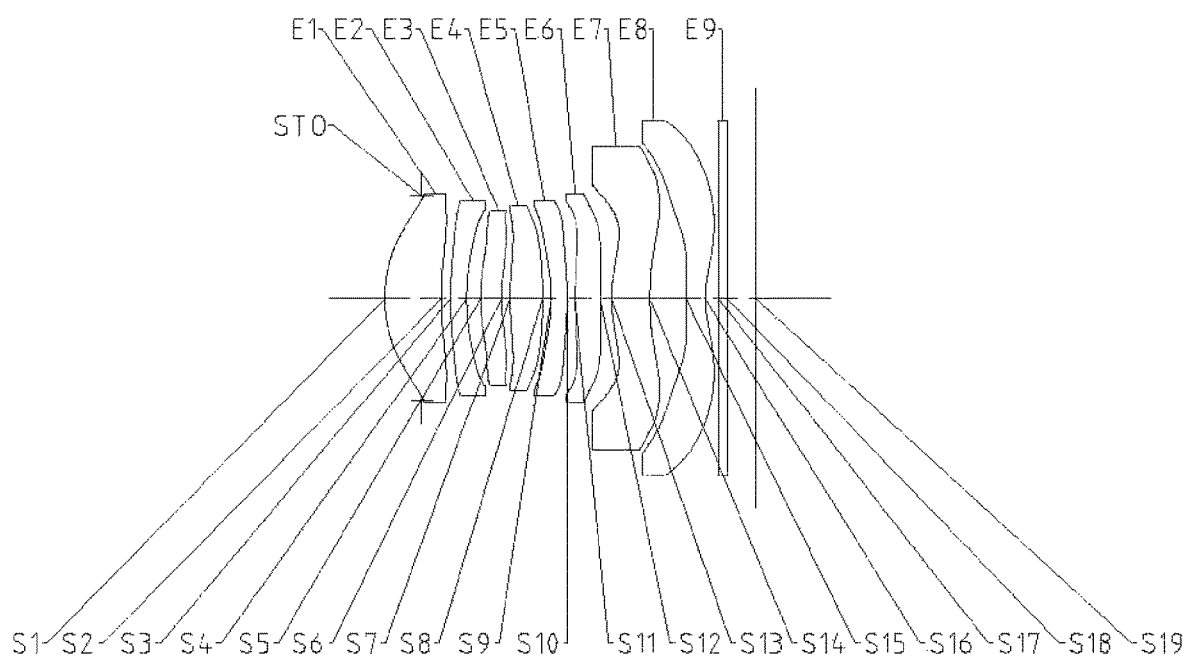
FIG. 9 shows a schematic view showing a structure of an optical imaging lens according to Embodiment 5 of the disclosure.

An optical imaging lens according to Embodiment 5 of the disclosure is described below with reference to FIGS. 9 to 10D. FIG. 9 is a schematic view showing a structure of an optical imaging lens according to Embodiment 5 of the disclosure.

As shown in FIG. 9, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a positive refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes sequentially through the respective surfaces S1 to S18 and is finally imaged at the imaging surface S19.

Table 13 shows the surface types, curvature radius, thickness, materials, and conic coefficient of each lens of the optical imaging lens of Embodiment 5, wherein the curvature radius and thickness are in millimeters (mm).

TABLE 13

| Surface Number | Surface types | Curvature radius | Thickness | Materials | | Conic coefficient |
|---|---|---|---|---|---|---|
| | | | | Refractive index | Abbe number | |
| OBJ | Spherical | Infinity | Infinity | | | |
| STO | Spherical | Infinity | −0.5200 | | | |
| S1 | Aspherical | 1.7343 | 0.7009 | 1.547 | 56.1 | −1.7296 |
| S2 | Aspherical | 4.9215 | 0.1122 | | | −27.3750 |
| S3 | Aspherical | 5.8295 | 0.2000 | 1.668 | 20.4 | −4.9269 |
| S4 | Aspherical | 3.0414 | 0.1702 | | | 4.9547 |
| S5 | Aspherical | 2.2041 | 0.2563 | 1.547 | 56.1 | −60.6886 |
| S6 | Aspherical | 2.4075 | 0.1101 | | | −12.3945 |
| S7 | Aspherical | 3.7874 | 0.4010 | 1.547 | 56.1 | −2.2649 |
| S8 | Aspherical | −12.1481 | 0.1017 | | | 88.9201 |
| S9 | Aspherical | −2.5427 | 0.2000 | 1.658 | 21.5 | −12.5425 |
| S10 | Aspherical | −5.2135 | 0.0973 | | | 12.0193 |
| S11 | Aspherical | 4.7658 | 0.3191 | 1.658 | 21.5 | −8.2577 |
| S12 | Aspherical | 4.8146 | 0.1396 | | | −63.3255 |
| S13 | Aspherical | 1.9297 | 0.4725 | 1.621 | 25.9 | −28.0308 |
| S14 | Aspherical | 3.9240 | 0.4446 | | | −30.7030 |
| S15 | Aspherical | 3.8772 | 0.2350 | 1.537 | 55.7 | −6.1879 |
| S16 | Aspherical | 1.3192 | 0.1673 | | | −9.3583 |
| S17 | Spherical | Infinity | 0.1100 | 1.517 | 64.2 | |
| S18 | Spherical | Infinity | 0.3522 | | | |
| S19 | Spherical | Infinity | | | | |

It can be seen from Table 13 that in Embodiment 5, both the object side surface and the image side surface of any one of the first lens E1 to the eighth lens E8 are aspheric surfaces. Table 14 shows higher order term coefficients that can be used for each aspherical mirror in Embodiment 5, wherein each aspherical surface type can be defined by Equation (1) given in Embodiment 1 above.

TABLE 14

| Surface Number | A4 | A6 | A8 | A10 | A12 | A14 | A16 | A18 | A20 |
|---|---|---|---|---|---|---|---|---|---|
| S1 | 4.0883E−02 | −4.4157E−02 | 1.8839E−01 | −5.0178E−01 | 7.9361E−01 | −7.6935E−01 | 4.4476E−01 | −1.4103E−01 | 1.8793E−02 |
| S2 | 6.3362E−03 | 1.2147E−01 | −7.0560E−01 | 1.5574E+00 | −2.1200E+00 | 1.8829E+00 | −1.0523E+00 | 3.3224E−01 | −4.4806E−02 |
| S3 | −9.0596E−03 | 1.2056E−01 | 5.1646E−01 | 6.8463E−01 | 2.0391E−01 | −3.4780E−01 | 3.9440E−01 | −1.6281E−01 | 2.4946E−02 |
| S4 | −7.8039E−02 | 1.9333E−01 | −5.9551E−01 | 8.4539E−01 | −7.3648E−01 | 6.9053E−01 | −7.2671E−01 | 4.7353E−01 | −1.2059E−01 |
| S5 | 3.9396E−01 | −1.9156E+00 | 6.2135E+00 | −1.4694E+01 | 2.3388E+01 | 2.4575E+01 | 1.6393E+01 | −6.2301E+00 | 1.0169E+00 |
| S6 | −1.9143E−01 | 7.2247E−01 | −2.6280E+00 | 6.2495E+00 | −1.0329E+01 | 1.1025E+01 | −7.0327E+00 | 2.4414E+00 | −3.5755E−01 |
| S7 | −1.7397E−01 | 2.2302E−01 | −2.2671E−01 | −2.5114E−02 | 2.7543E−01 | −5.3915E−01 | 6.7659E−01 | −4.2056E−01 | 9.9446E−02 |
| S8 | −2.9928E−01 | 8.0020E−01 | −1.3028E+00 | 2.3521E+00 | −5.1318E+00 | 7.6847E+00 | −6.6101E+00 | 2.9880E+00 | −5.5078E−01 |
| S9 | −2.7810E−01 | 1.2086E+00 | −1.4939E+00 | −6.0264E−01 | 3.6642E+00 | −4.4221E+00 | 2.6135E+00 | −7.6720E−01 | 8.6478E−02 |
| S10 | 1.8485E−01 | 1.3331E+00 | −3.0669E+00 | 3.9500E+00 | 3.1975E+00 | 1.6554E+00 | −5.3281E−01 | 9.6358E−02 | −7.2732E−03 |
| S11 | −3.0279E−01 | 1.0860E+00 | −2.8669E+00 | 5.0770E+00 | −6.2288E+00 | 5.1038E+00 | −2.6331E+00 | 7.6430E−01 | −9.4088E−02 |
| S12 | −2.9705E−01 | 6.5637E−01 | −1.3648E+00 | 1.9972E+00 | −2.0769E+00 | 1.4755E+00 | −6.6860E−01 | 1.7238E−01 | −1.9060E−02 |
| S13 | 1.3137E−01 | −4.8656E−01 | 7.6699E−01 | −9.5317E−01 | 7.2092E−01 | −3.1148E−01 | 7.3424E−02 | −8.1467E−03 | 2.7642E−04 |
| S14 | 5.8673E−02 | 6.2880E−03 | −1.5147E−01 | 1.6649E−01 | −9.0812E−02 | 2.8700E−02 | −5.2978E−03 | 5.2558E−04 | −2.1257E−05 |
| S15 | −5.5401E−01 | 6.1771E−01 | −4.8192E−01 | 2.9606E−01 | −1.3308E−01 | 3.9822E−02 | −7.3619E−03 | 7.5603E−04 | −3.2889E−05 |
| S16 | −2.2526E−01 | 1.9832E−01 | −1.3048E−01 | 5.8627E−02 | −1.7377E−02 | 3.3089E−03 | −3.8826E−04 | 2.5472E−05 | −7.1244E−07 |

Table 15 shows an effective focal lengths f1 to f8 of each lens in Embodiment 5, the total effective focal length f of the optical imaging lens, and the total optical length TTL.

TABLE 15

| f1 (mm) | 4.55 | f6 (mm) | 198.73 |
|---|---|---|---|
| f2 (mm) | −9.81 | f7 (mm) | 5.61 |
| f3 (mm) | 33.03 | f8 (mm) | −3.85 |
| f4 (mm) | 5.33 | f (mm) | 3.54 |
| f5 (mm) | −7.77 | TTL (mm) | 4.59 |

Figure 10A:
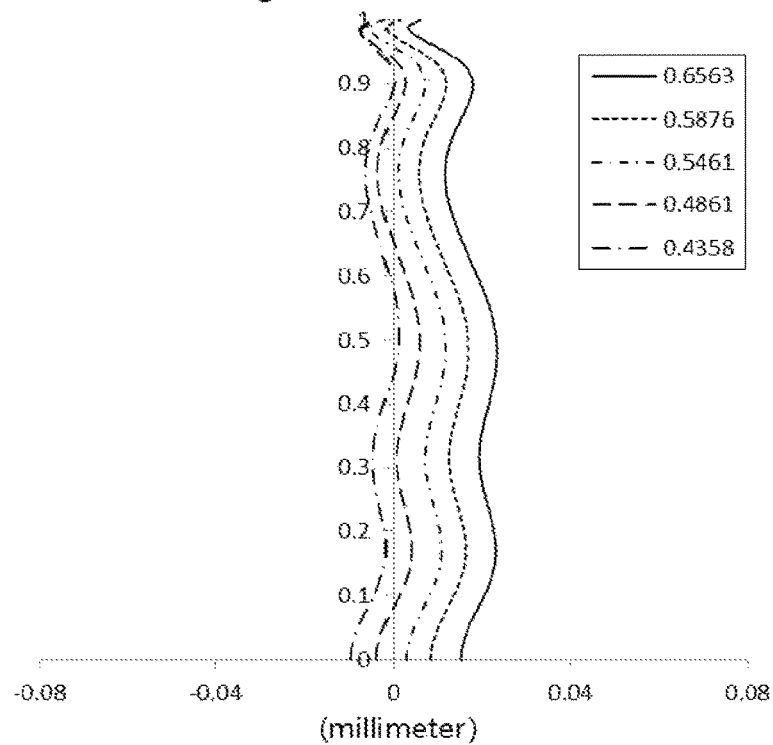
FIGS. 10A to 10D show a longitudinal aberration curve, an astigmatism curve, a distortion curve, and a lateral color curve of the optical imaging lens of Embodiment 5, respectively.
Figure 10B:
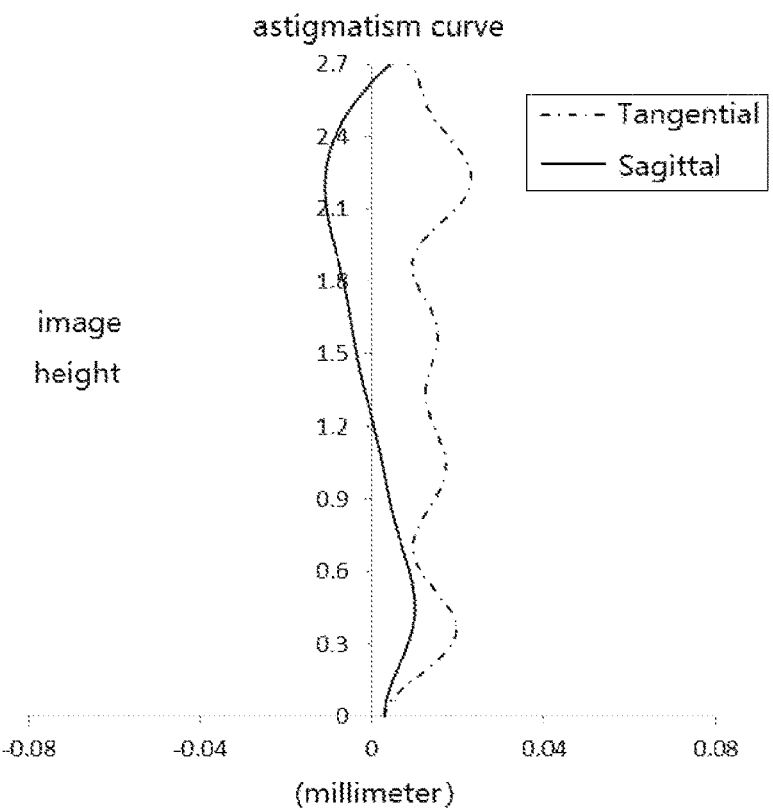
Figure 10C:
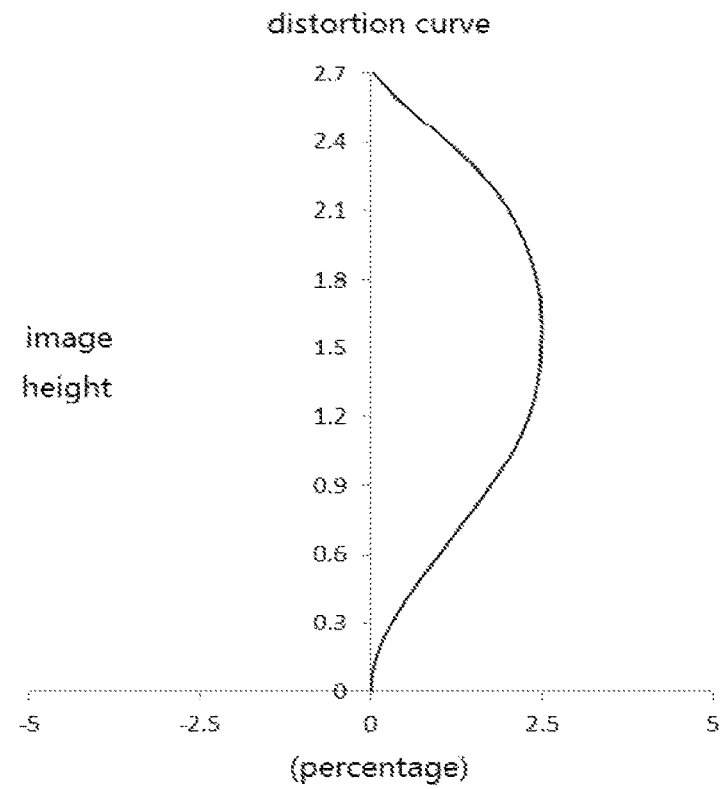
Figure 10D:
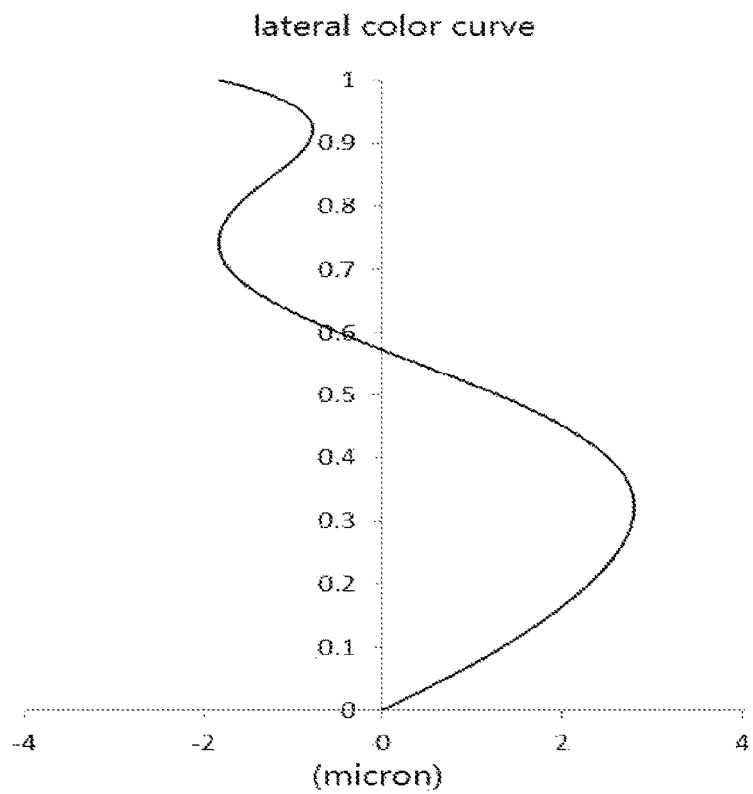

FIG. 10A shows a longitudinal aberration curve of the optical imaging lens of Embodiment 5, which indicates the deviations of light of different wavelengths from a convergent focus point after passing through the lens. FIG. 10B shows an astigmatism curve of the optical imaging lens of Embodiment 5, which indicates a tangential image plane curvature and a sagittal image plane curvature. FIG. 10C shows a distortion curve of the optical imaging lens of Embodiment 5, which indicates a distortion value under different image heights. FIG. 10D shows the lateral color curve of the optical imaging lens of Embodiment 5, which indicates the deviation of different image heights on the imaging surface of light passing through the lens. It can be seen from FIGS. 10A to 10D that, the optical imaging lens provided in Embodiment 5 can achieve good imaging quality.

Embodiment 6

Figure 11:
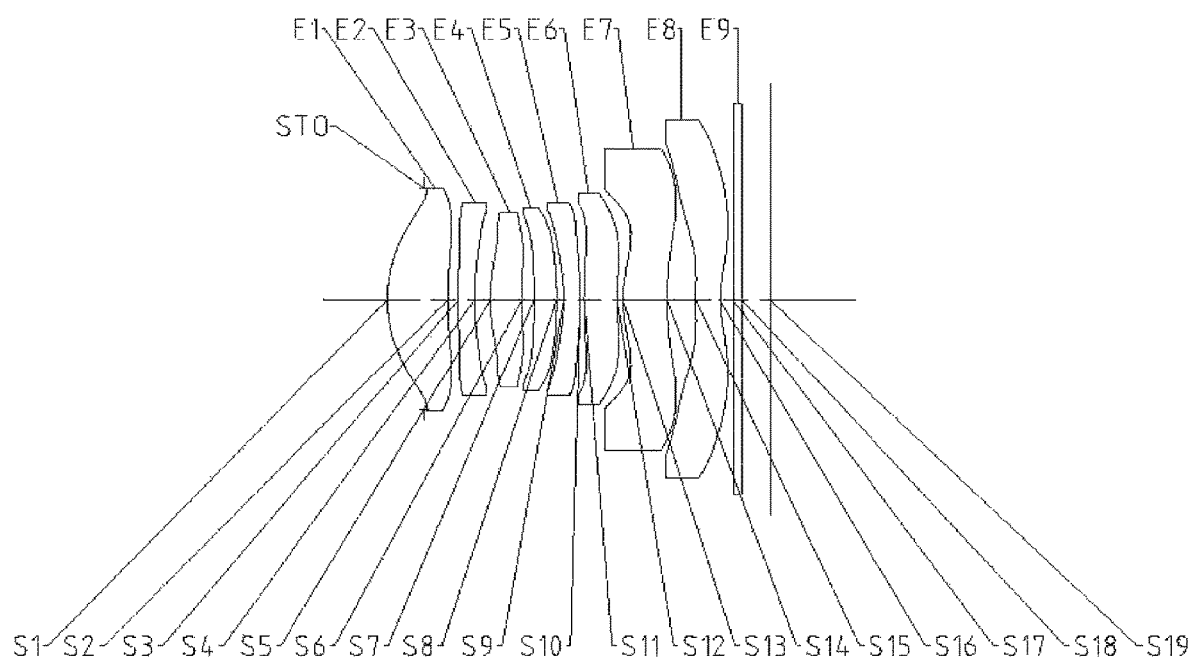
FIG. 11 shows a schematic view showing a structure of an optical imaging lens according to Embodiment 6 of the disclosure.

An optical imaging lens according to Embodiment 6 of the disclosure is described below with reference to FIGS. 11 to 12D. FIG. 11 is a schematic view showing a structure of an optical imaging lens according to Embodiment 6 of the disclosure.

As shown in FIG. 11, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a concave surface and an image side surface S8 of the fourth lens is a convex surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 16 shows the surface types, curvature radius, thickness, materials, and conic coefficient of each lens of the optical imaging lens of Embodiment 6, wherein the curvature radius and thickness are in millimeters (mm).

TABLE 16

| Surface Number | Surface types | Curvature radius | Thickness | Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 1.7698 | 0.7451 | 1.547 | 56.1 | −1.7414 |
| S2 | Aspherical | 7.3727 | 0.1277 | | | −22.2831 |
| S3 | Aspherical | 12.5638 | 0.2000 | 1.668 | 20.4 | −9.1939 |
| S4 | Aspherical | 3.4569 | 0.1947 | | | 4.5675 |
| S5 | Aspherical | 2.2530 | 0.3857 | 1.547 | 56.1 | −56.2450 |
| S6 | Aspherical | 6.6105 | 0.1494 | | | −21.9932 |
| S7 | Aspherical | −200.0000 | 0.2783 | 1.547 | 56.1 | −99.0000 |
| S8 | Aspherical | −11.0229 | 0.0915 | | | 87.0768 |
| S9 | Aspherical | −2.5142 | 0.2000 | 1.658 | 21.5 | −10.8882 |
| S10 | Aspherical | −5.0849 | 0.0549 | | | 11.5366 |
| S11 | Aspherical | 4.8862 | 0.4057 | 1.658 | 21.5 | −4.7599 |
| S12 | Aspherical | 3.1716 | 0.0728 | | | −64.9961 |
| S13 | Aspherical | 1.6473 | 0.5401 | 1.621 | 25.9 | −26.1078 |
| S14 | Aspherical | 4.5901 | 0.3532 | | | −36.8758 |
| S15 | Aspherical | 5.3421 | 0.3000 | 1.537 | 55.7 | −2.1713 |
| S16 | Aspherical | 1.4567 | 0.1587 | | | −11.0735 |
| S17 | Spherical | Infinity | 0.1100 | 1.517 | 64.2 | |
| S18 | Spherical | Infinity | 0.3460 | | | |
| S19 | Spherical | Infinity | | | | |

It can be seen from Table 16 that in Embodiment 6, both the object side surface and the image side surface of any one of the first lens E1 to the eighth lens E8 are aspheric surfaces. Table 17 shows higher order term coefficients that can be used for each aspherical mirror in Embodiment 6, wherein each aspherical surface type can be defined by Equation (1) given in Embodiment 1 above.

TABLE 17

| Surface Number | A4 | A6 | A8 | A10 | A12 | A14 | A16 | A18 | A20 |
|---|---|---|---|---|---|---|---|---|---|
| S1 | 2.1580E−02 | 8.1713E−02 | −2.6137E−01 | 4.7097E−01 | −5.3651E−01 | 3.8830E−01 | −1.7513E−01 | 4.4318E−02 | −4.7688E−03 |
| S2 | 3.8774E−02 | −1.5116E−01 | 3.4858E−01 | −6.7442E−01 | 7.8201E−01 | −5.4199E−01 | 2.2449E−01 | −5.1957E−02 | 5.2151E−03 |
| S3 | 1.1445E−03 | −5.5313E−02 | 1.9443E−01 | −6.8117E−01 | 1.2414E+00 | −1.2413E+00 | 7.2139E−01 | −2.3031E−01 | 3.1209E−02 |
| S4 | −6.3942E−02 | −1.3238E−01 | 8.4111E−01 | −2.8347E+00 | 5.4695E+00 | −6.2625E+00 | 4.2487E+00 | −1.5704E+00 | 2.4243E−01 |
| S5 | 3.8301E−01 | −1.4481E+00 | 3.3804E+00 | −5.6368E+00 | 5.9120E+00 | −3.6352E+00 | 1.2093E+00 | −1.6135E−01 | −3.9273E−03 |
| se | −1.2268E−01 | 2.5989E−01 | −9.3947E−01 | 1.5925E+00 | −1.7628E+00 | 1.3936E+00 | −6.3712E−01 | 9.2088E−02 | 1.9629E−02 |
| S7 | −1.2082E−01 | −1.2499E−01 | 9.9469E−01 | −2.6697E+00 | 3.4901E+00 | −1.8068E+00 | −4.3347E−01 | 7.9796E−01 | −2.2011E−01 |
| SS | −3.1032E−01 | 5.1186E−01 | 1.8685E+00 | −1.1271E+01 | 2.5177E+01 | −3.0551E+01 | 2.1123E+01 | −7.8361E+00 | 1.2165E+00 |
| S9 | −2.6826E−01 | 1.3410E+00 | −1.5344E+00 | −3.5246E+00 | 1.3188E+01 | −1.7966E+01 | 1.2715E+01 | −4.6336E+00 | 6.8627E−01 |
| S10 | −2.7887E−01 | 2.0111E+00 | −5.4121E+00 | 8.4828E+00 | −8.4388E+00 | 5.4057E+00 | −2.1679E+00 | 4.9475E−01 | −4.8826E−02 |
| S11 | −3.1880E−01 | 1.2034E+00 | −3.3978E+00 | 6.4552E+00 | −8.3348E+00 | 7.1206E+00 | −3.8201E+00 | 1.1520E+00 | −1.4738E−01 |
| S12 | −1.7058E−01 | 1.2591E−01 | −2.7563E−01 | 5.5597E−01 | −8.1605E−01 | 7.8717E−01 | −4.5778E−01 | 1.4329E−01 | −1.8328E−02 |
| S13 | 2.0438E−01 | −8.4598E−01 | 1.6627E+00 | −2.3705E+00 | 2.1019E+00 | −1.1255E+00 | 3.5354E−01 | −5.9426E−02 | 4.1090E−03 |
| S14 | 8.5337E−03 | 1.3710E−01 | −2.9708E−01 | 2.6253E−01 | −1.2998E−01 | 3.8392E−02 | −6.6507E−03 | 6.1512E−04 | −2.2893E−05 |
| S15 | −5.7325E−01 | 6.2640E−01 | −3.8670E−01 | 1.6736E−01 | −5.6529E−02 | 1.4526E−02 | −2.5217E−03 | 2.5187E−04 | −1.0717E−05 |
| S16 | −2.2444E−01 | 1.9838E−01 | −1.1794E−01 | 4.5835E−02 | −1.1542E−02 | 1.8658E−03 | −1.8727E−04 | 1.0623E−05 | −2.5979E−07 |

Table 18 shows an effective focal lengths f1 to f8 of each lens in Embodiment 6, the total effective focal length f of the optical imaging lens, and the total optical length TTL.

TABLE 18

| f1 (mm) | 4.07 | f6 (mm) | −15.16 |
|---|---|---|---|
| f2 (mm) | −7.21 | f7 (mm) | 3.87 |
| f3 (mm) | 6.06 | f8 (mm) | −3.83 |
| f4 (mm) | 21.34 | f (mm) | 3.54 |
| f5 (mm) | −7.80 | TTL (mm) | 4.71 |

Figure 12A:
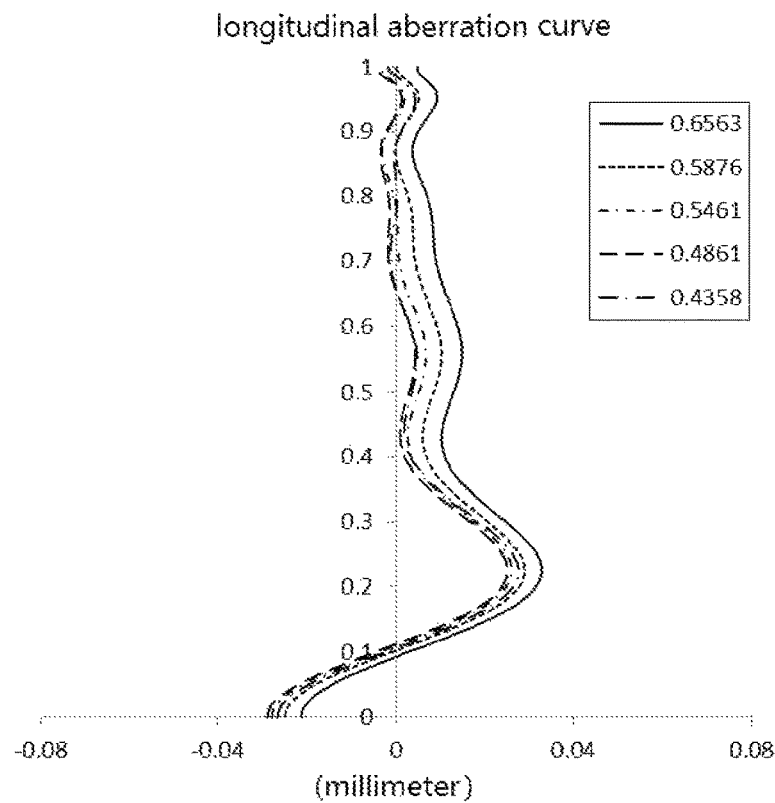
FIGS. 12A to 12D show a longitudinal aberration curve, an astigmatism curve, a distortion curve, and a lateral color curve of the optical imaging lens of Embodiment 6, respectively.
Figure 12B:
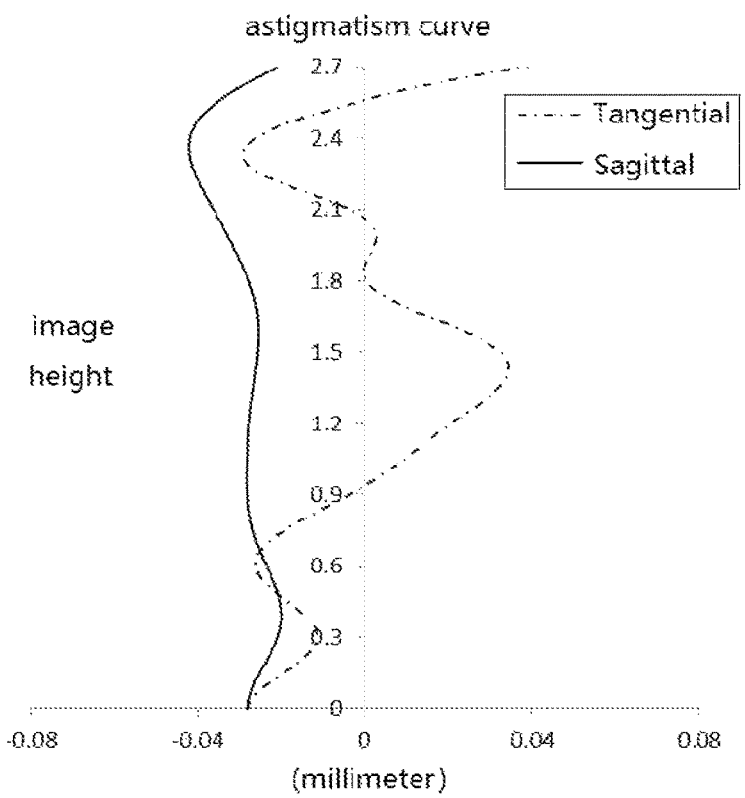
Figure 12C:
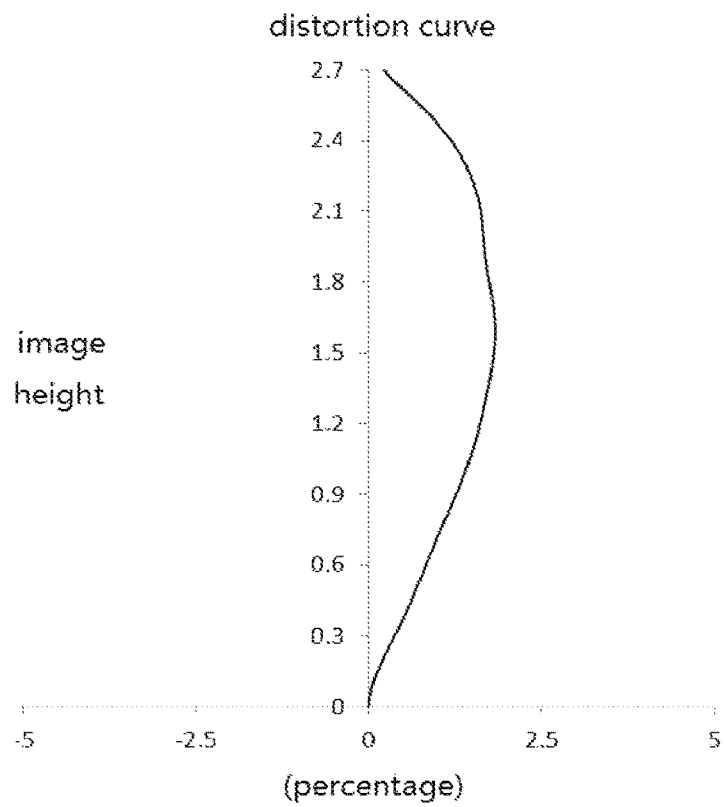
Figure 12D:
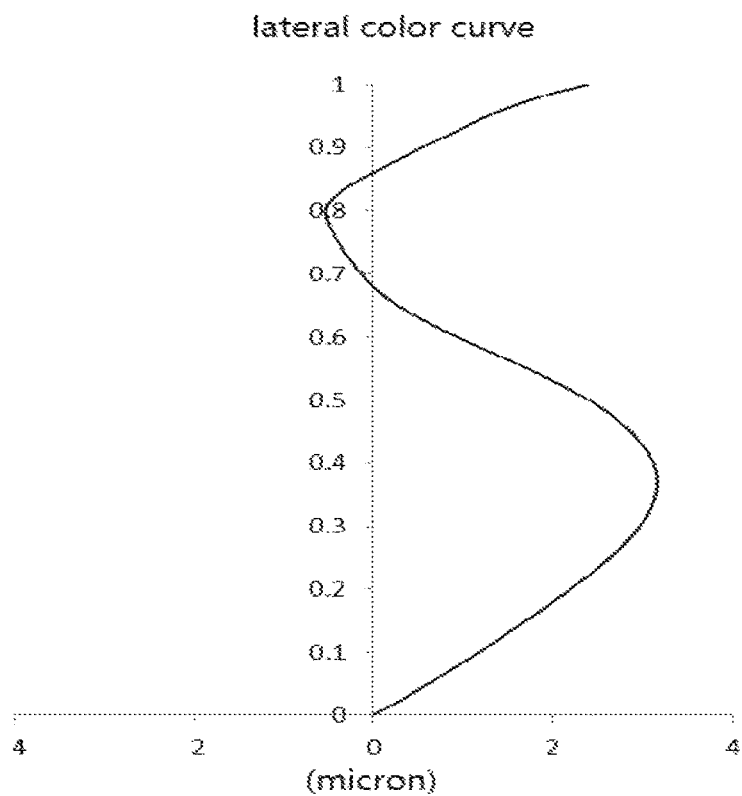

FIG. 12A shows a longitudinal aberration curve of the optical imaging lens of Embodiment 6, which indicates the deviations of light of different wavelengths from a convergent focus point after passing through the lens. FIG. 12B shows an astigmatism curve of the optical imaging lens of Embodiment 6, which indicates a tangential image plane curvature and a sagittal image plane curvature. FIG. 12C shows a distortion curve of the optical imaging lens of Embodiment 6, which indicates a distortion value under different image heights. FIG. 12D shows the lateral color curve of the optical imaging lens of Embodiment 6, which indicates the deviation of different image heights on the imaging surface of light passing through the lens. It can be seen from FIGS. 12A to 12D that, the optical imaging lens provided in Embodiment 6 can achieve good imaging quality.

Embodiment 7

Figure 13:
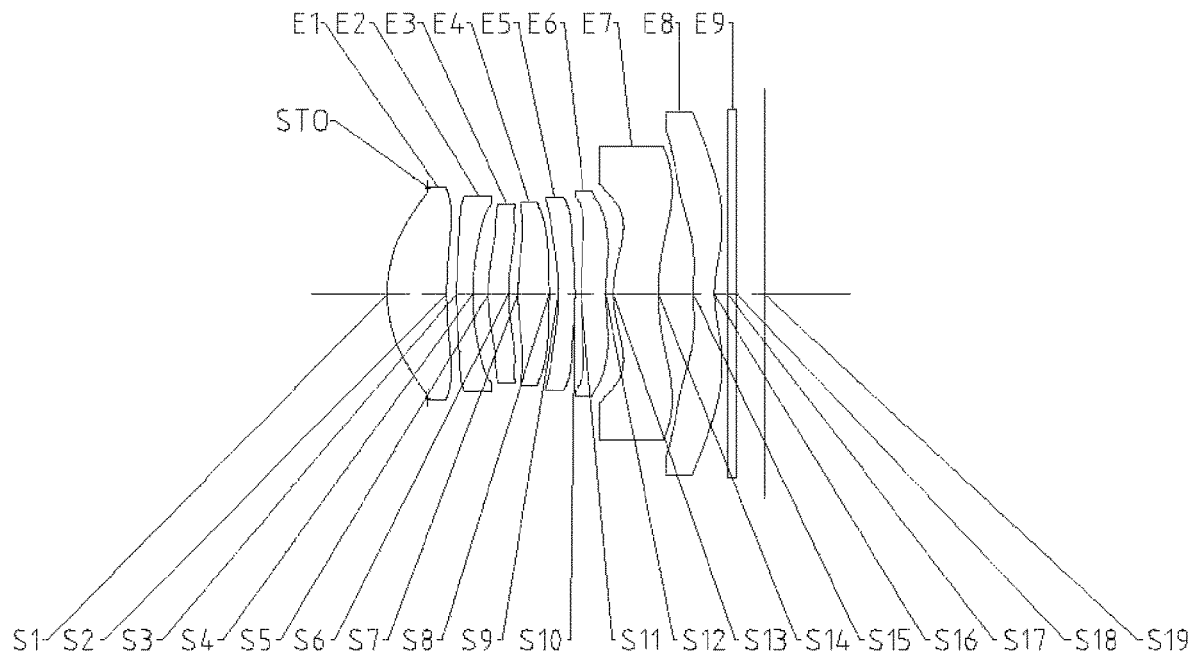
FIG. 13 shows a schematic view showing the structure of an optical imaging lens according to Embodiment 7 of the disclosure.

An optical imaging lens according to Embodiment 7 of the disclosure is described below with reference to FIGS. 13 to 14D. FIG. 13 is a schematic view showing a structure of an optical imaging lens according to Embodiment 7 of the disclosure.

As shown in FIG. 13, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a concave surface. The fifth lens E5 has a negative refractive power, an object side surface S9 of the fifth lens is a concave surface and an image side surface S10 of the fifth lens is a convex surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 19 shows the surface types, curvature radius, thickness, materials, and conic coefficient of each lens of the optical imaging lens of Embodiment 7, wherein the curvature radius and thickness are in millimeters (mm).

TABLE 19

| Surface Number | Surface types | Curvature radius | Thickness | Refractive index | Abbe number | Conic coefficient |
|---|---|---|---|---|---|---|
| OBJ | Spherical | Infinity | Infinity | | | |
| STO | Spherical | Infinity | −0.5200 | | | |
| S1 | Aspherical | 1.7606 | 0.7312 | 1.547 | 56.1 | −1.5601 |
| S2 | Aspherical | 5.6574 | 0.1211 | | | −25.1957 |
| S3 | Aspherical | 7.0178 | 0.2000 | 1.668 | 20.4 | −13.5282 |
| S4 | Aspherical | 3.1083 | 0.1913 | | | 5.0478 |
| S5 | Aspherical | 2.1772 | 0.2461 | 1.547 | 56.1 | −62.1626 |
| S6 | Aspherical | 2.1668 | 0.1175 | | | −11.5259 |
| S7 | Aspherical | 3.0699 | 0.3817 | 1.547 | 56.1 | −2.0187 |
| S8 | Aspherical | 500.0000 | 0.1181 | | | 99.0000 |
| S9 | Aspherical | −3.2893 | 0.2000 | 1.658 | 21.5 | −14.1594 |
| S10 | Aspherical | −5.4210 | 0.0805 | | | 13.4583 |
| S11 | Aspherical | 4.5818 | 0.3034 | 1.658 | 21.5 | −2.2594 |
| S12 | Aspherical | 2.1077 | 0.0967 | | | −69.5965 |
| S13 | Aspherical | 1.2747 | 0.5503 | 1.621 | 25.9 | −20.1523 |
| S14 | Aspherical | 3.4180 | 0.4305 | | | −16.1059 |
| S15 | Aspherical | 4.5955 | 0.2589 | 1.537 | 55.7 | −1.0483 |
| S16 | Aspherical | 1.5273 | 0.1632 | | | −8.4604 |
| S17 | Spherical | Infinity | 0.1100 | 1.517 | 64.2 | |
| S18 | Spherical | Infinity | 0.3397 | | | |
| S19 | Spherical | Infinity | | | | |

It can be seen from Table 19 that in Embodiment 7, both the object side surface and the image side surface of any one of the first lens E1 to the eighth lens E8 are aspherical surface. Table 20 shows higher order term coefficients that can be used for each aspherical mirror in Embodiment 7, wherein each aspherical surface type can be defined by Equation (1) given in Embodiment 1 above.

TABLE 20

| Surface Number | A4 | A6 | A8 | A10 | A12 | A14 | A16 | A18 | A20 |
|---|---|---|---|---|---|---|---|---|---|
| S1 | 4.0917E−02 | −4.5677E−02 | 1.4300E−01 | −2.8409E−01 | 3.4407E−01 | −2.6055E−01 | 1.2013E−01 | −3.1487E−02 | 3.6041E−03 |
| S2 | 1.8875E−02 | 2.0350E−02 | −3.1817E−01 | 6.1677E−01 | −6.3146E−01 | 3.8789E−01 | −1.4305E−01 | 2.8994E−02 | −2.4600E−03 |
| S3 | 5.9252E−03 | 9.8092E−02 | −7.0918E−01 | 1.4955E+00 | −1.6782E+00 | 1.1394E+00 | −4.6632E−01 | 1.0576E−01 | −1.0197E−02 |
| S4 | −4.0431E−02 | 1.9207E−02 | −5.0346E−02 | −5.1582E−01 | 1.9638E+00 | −2.9975E+00 | 2.3620E+00 | −9.3794E−01 | 1.4762E−01 |
| S5 | 3.9752E−01 | −1.8970E+00 | 5.9762E+00 | −1.3498E+01 | 2.0412E+01 | −2.0189E+01 | 1.2535E+01 | −4.3993E+00 | 6.6087E−01 |
| S6 | −2.2319E−01 | 9.0207E−01 | −3.0219E+00 | 6.4422E+00 | −9.3236E+00 | 8.8177E+00 | −5.0925E+00 | 1.6271E+00 | −2.2131E−01 |
| S7 | −1.6202E−01 | 1.1418E−01 | 3.2180E−01 | −1.4040E+00 | 2.1457E+00 | −1.7918E+00 | 8.6162E−01 | −2.1687E−01 | 2.2201E−02 |
| S8 | −2.5064E−01 | 2.7680E−01 | 6.4977E−01 | −2.4705E+00 | 3.3203E+00 | −2.3901E+00 | 9.4812E−01 | −1.8320E−01 | 1.2535E−02 |
| S9 | −2.5919E−01 | 9.4028E−01 | −6.4694E−01 | 1.8765E+00 | 4.7908E+00 | −5.0902E+00 | 2.9271E+00 | −8.8276E−01 | 1.0843E−01 |
| S10 | −2.4829E−01 | 1.6140E+00 | −3.5295E+00 | 4.3058E+00 | −3.2547E+00 | 1.5319E+00 | −4.2954E−01 | 6.2875E−02 | −3.1852E−03 |
| S11 | −4.1355E−01 | 1.6115E+00 | −4.0193E+00 | 6.6949E+00 | −7.6890E+00 | 5.8966E+00 | −2.8566E+00 | 7.8281E−01 | −9.1471E−02 |
| S12 | −2.1337E−01 | 1.7281E−01 | −8.8844E−02 | 8.5417E−02 | −2.7902E−01 | 3.8158E−01 | −2.5190E−01 | 8.3040E−02 | −1.0925E−02 |

TABLE 20-continued

| Surface Number | A4 | A6 | A8 | A10 | A12 | A14 | A16 | A18 | A20 |
|---|---|---|---|---|---|---|---|---|---|
| S13 | 2.4350E-01 | -9.3170E-01 | 1.5984E+00 | -1.8373E+00 | 1.2710E+00 | -5.1230E-01 | 1.1423E-01 | -1.1856E-02 | 3.0906E-04 |
| S14 | 9.5533E-02 | -1.0256E-01 | 1.3112E-02 | 2.5792E-02 | -1.6431E-02 | 3.8851E-03 | -2.1840E-04 | -5.4452E-05 | 6.8439E-06 |
| S15 | -4.5279E-01 | 3.5589E-01 | -1.2236E-01 | 1.7850E-02 | -2.3876E-03 | 1.5801E-03 | -5.2921E-04 | 7.3205E-05 | -3.6676E-06 |
| S16 | -2.3342E-01 | 1.7235E-01 | -8.6925E-02 | 2.9900E-02 | -6.9107E-03 | 1.0537E-03 | -1.0130E-04 | 5.5299E-06 | -1.2990E-07 |

Table 21 shows an effective focal lengths f1 to f8 of each lens in Embodiment 7, the total effective focal length f of the optical imaging lens, and the total optical length TTL.

TABLE 21

| f1 (mm) | 4.39 | f6 (mm) | -6.23 |
|---|---|---|---|
| f2 (mm) | -8.53 | f7 (mm) | 2.98 |
| f3 (mm) | 112.67 | f8 (mm) | -4.39 |
| f4 (mm) | 5.65 | f (mm) | 3.48 |
| f5 (mm) | -13.20 | TTL (mm) | 4.64 |

Figure 14A:
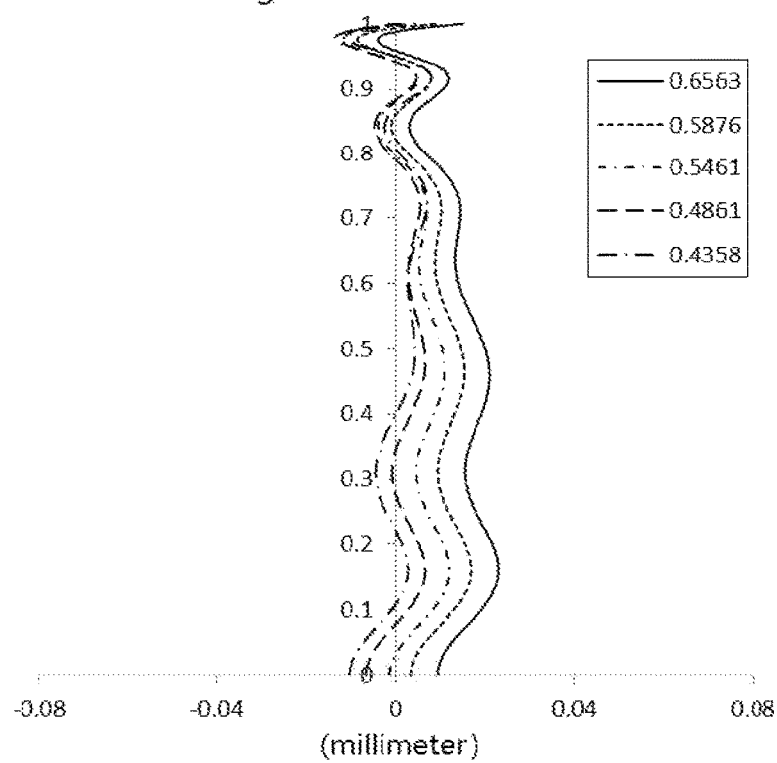
FIGS. 14A to 14D show a longitudinal aberration curve, an astigmatism curve, a distortion curve, and a lateral color curve of the optical imaging lens of Embodiment 7, respectively.
Figure 14B:
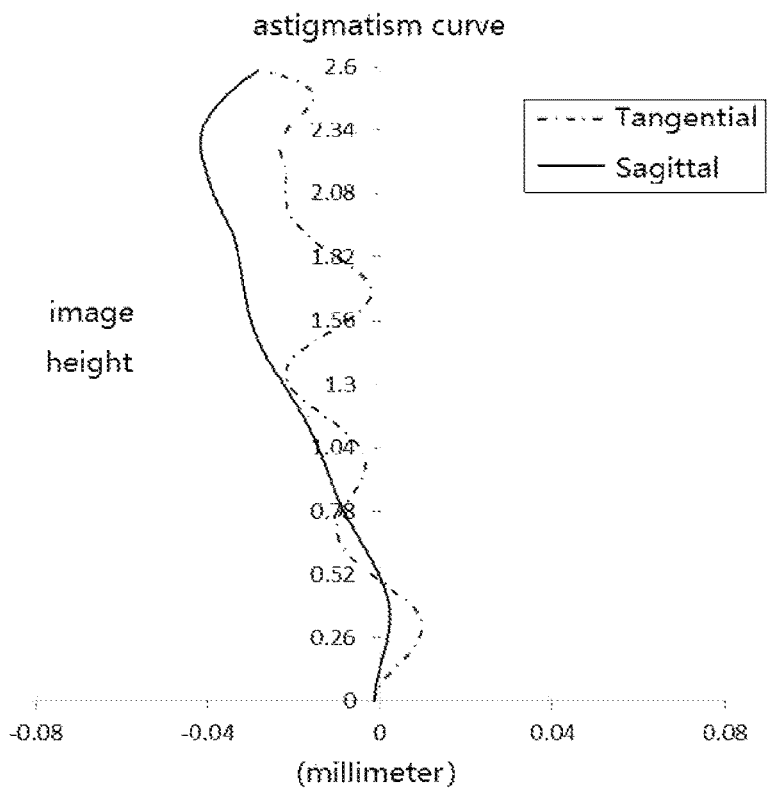
Figure 14C:
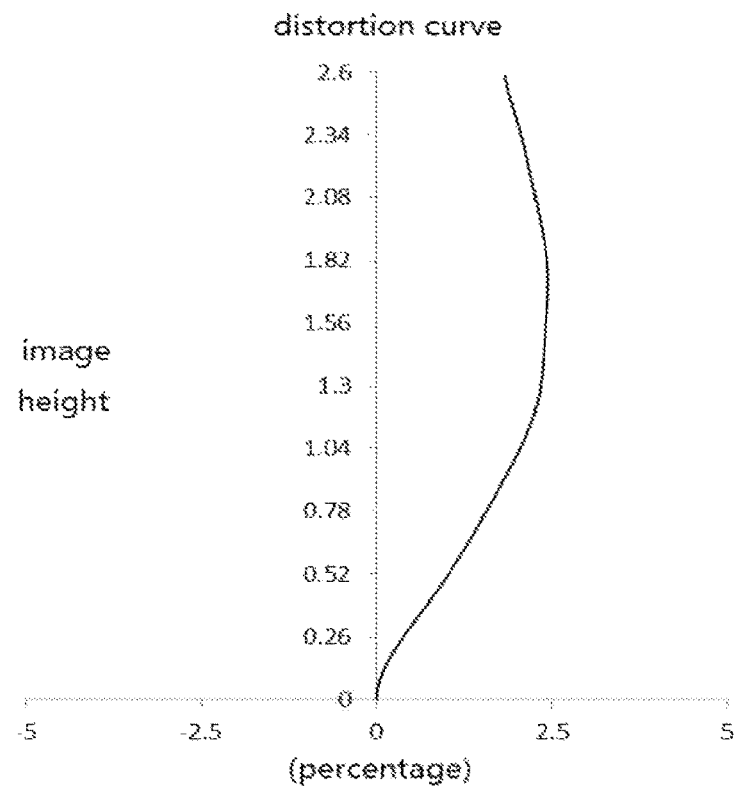
Figure 14D:
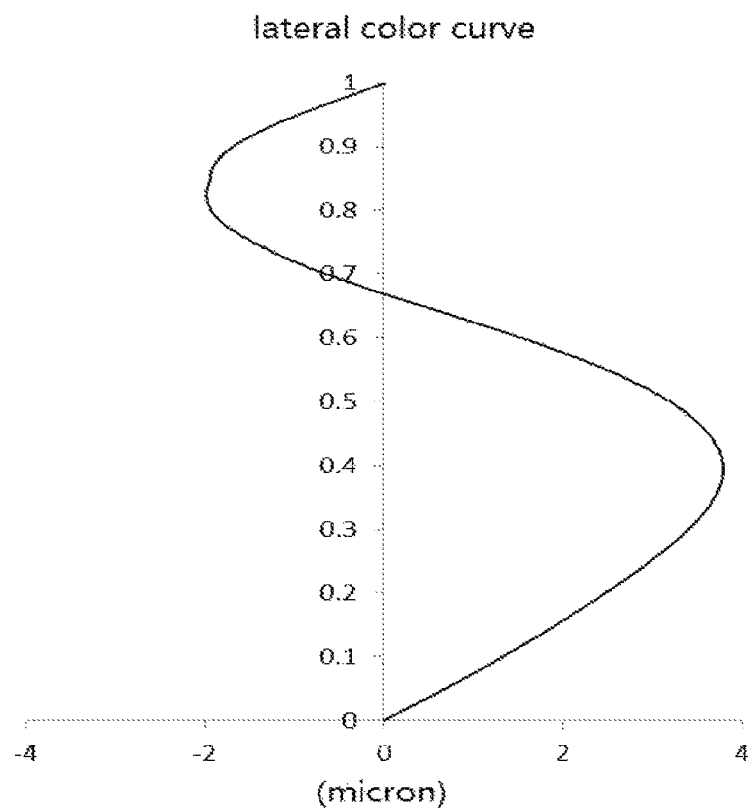

FIG. 14A shows a longitudinal aberration curve of the optical imaging lens of Embodiment 7, which indicates the deviations of light of different wavelengths from a convergent focus point after passing through the lens. FIG. 14B shows an astigmatism curve of the optical imaging lens of Embodiment 7, which indicates a tangential image plane curvature and a sagittal image plane curvature. FIG. 14C shows a distortion curve of the optical imaging lens of Embodiment 7, which indicates a distortion value under different image heights. FIG. 14D shows the lateral color curve of the optical imaging lens of Embodiment 7, which indicates the deviation of different image heights on the imaging surface of light passing through the lens. It can be seen from FIGS. 14A to 14D that, the optical imaging lens provided in Embodiment 7 can achieve good imaging quality.

Embodiment 8

Figure 15:
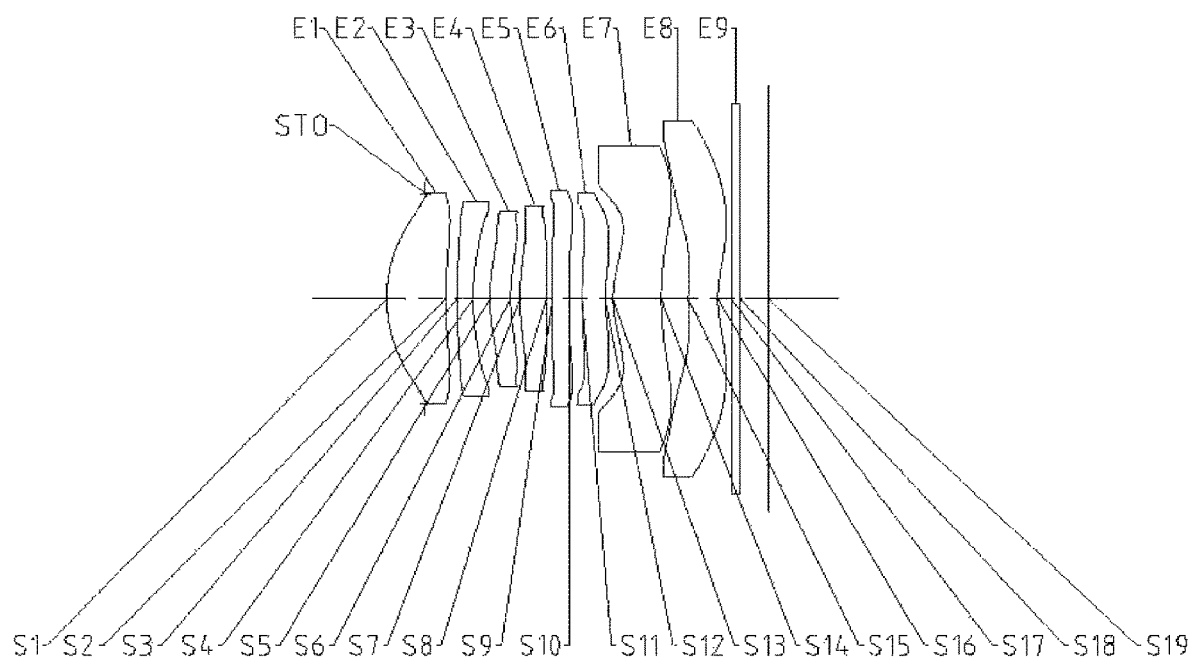
FIG. 15 shows a schematic view showing the structure of an optical imaging lens according to Embodiment 8 of the disclosure.

An optical imaging lens according to Embodiment 8 of the disclosure is described below with reference to FIGS. 15 to 16D. FIG. 15 is a schematic view showing a structure of an optical imaging lens according to Embodiment 8 of the disclosure.

As shown in FIG. 15, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a concave surface. The fifth lens E5 has a negative refractive power, an object side surface S9 of the fifth lens is a convex surface and an image side surface S10 of the fifth lens is a concave surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes through the respective surfaces S1 to S18 sequentially and is finally imaged at the imaging surface S19.

Table 22 shows the surface types, curvature radius, thickness, materials, and conic coefficient of each lens of the optical imaging lens of Embodiment 8, wherein the curvature radius and thickness are in millimeters (mm).

TABLE 22

| Surface Number | Surface types | Curvature radius | Thickness | Materials Refractive index | Abbe number | Conic coefficient |
|---|---|---|---|---|---|---|
| OBJ | Spherical | Infinity | Infinity | | | |
| STO | Spherical | Infinity | -0.5200 | | | |
| S1 | Aspherical | 1.7781 | 0.7253 | 1.547 | 56.1 | -1.6844 |
| S2 | Aspherical | 5.9898 | 0.1396 | | | -24.5955 |
| S3 | Aspherical | 7.7173 | 0.2000 | 1.668 | 20.4 | -11.1064 |
| S4 | Aspherical | 3.2325 | 0.2053 | | | 4.9670 |
| S5 | Aspherical | 2.1350 | 0.2510 | 1.547 | 56.1 | -57.6114 |
| S6 | Aspherical | 2.1631 | 0.1170 | | | -11.8457 |
| S7 | Aspherical | 2.8871 | 0.3264 | 1.547 | 56.1 | -0.4714 |
| S8 | Aspherical | 11.2984 | 0.0774 | | | 73.6427 |
| S9 | Aspherical | 696.6028 | 0.2000 | 1.658 | 21.5 | 99.0000 |
| S10 | Aspherical | 33.1875 | 0.1670 | | | -99.0000 |
| S11 | Aspherical | 4.0225 | 0.2836 | 1.658 | 21.5 | -5.1026 |
| S12 | Aspherical | 1.5837 | 0.0994 | | | -39.4748 |
| S13 | Aspherical | 1.3237 | 0.5922 | 1.621 | 25.9 | -20.2090 |

TABLE 22-continued

| Surface Number | Surface types | Curvature radius | Thickness | Materials Refractive index | Abbe number | Conic coefficient |
|---|---|---|---|---|---|---|
| S14 | Aspherical | 4.8055 | 0.3321 | | | −30.1664 |
| S15 | Aspherical | 4.2655 | 0.3625 | 1.537 | 55.7 | 1.6227 |
| S16 | Aspherical | 1.5441 | 0.1671 | | | −7.6013 |
| S17 | Spherical | Infinity | 0.1100 | 1.517 | 64.2 | |
| S18 | Spherical | Infinity | 0.3480 | | | |
| S19 | Spherical | Infinity | | | | |

It can be seen from Table 22 that in Embodiment 8, both the object side surface and the image side surface of any one of the first lens E1 to the eighth lens E8 are aspherical surface. Table 23 shows higher order term coefficients that can be used for each aspherical mirror in Embodiment 8, wherein each aspherical surface type can be defined by Equation (1) given in Embodiment 1 above.

TABLE 23

| Surface Number | A4 | A6 | A8 | A10 | A12 | A14 | A16 | A18 | A20 |
|---|---|---|---|---|---|---|---|---|---|
| S1 | 4.2510E−02 | −5.7745E−02 | 1.8871E−01 | −3.8897E−01 | 4.8466E−01 | −3.7536E−01 | 1.7585E−01 | −4.6121E−02 | 5.2039E−03 |
| S2 | 1.5071E−02 | −2.9417E−03 | −1.7359E−01 | 3.1504E−01 | −2.8871E−01 | 1.5156E−01 | −4.3784E−02 | 5.5705E−03 | −7.5709E−05 |
| S3 | −6.5403E−03 | 1.0941E−01 | −5.9686E−01 | 1.1578E+00 | −1.2120E+00 | 7.6226E−01 | −2.8545E−01 | 5.8820E−02 | −5.2074E−03 |
| S4 | −6.3008E−02 | 1.1413E−01 | −3.5522E−01 | 2.8050E−01 | 5.5617E−01 | −1.4389E+00 | 1.3423E+00 | −5.8686E−01 | 1.0035E−01 |
| S5 | 3.6940E−01 | −1.6145E+00 | 4.5257E+00 | −9.2220E+00 | 1.2618E+01 | −1.1174E+01 | 6.1213E+00 | −1.8593E+00 | 2.3502E−01 |
| S6 | −2.2481E−01 | 9.6424E−01 | −3.2856E+00 | 7.1398E+00 | −1.0881E+01 | 1.1312E+01 | −7.4750E+00 | 2.8149E+00 | −4.5851E−01 |
| S7 | −2.1702E−01 | 4.2119E−01 | −6.3988E−01 | 1.1040E+00 | −2.7946E+00 | 4.6078E+00 | −4.1593E+00 | 1.9386E+00 | −3.6553E−01 |
| S8 | −3.2982E−01 | 6.0934E−01 | 5.4608E−01 | −4.4948E+00 | 8.9881E+00 | 9.7886E+00 | 6.2706E+00 | −2.2252E+00 | 3.4107E−01 |
| S9 | −1.9860E−01 | 8.7962E−01 | −1.2817E+00 | 3.2174E−01 | 1.3167E+00 | −1.8202E+00 | 1.0369E+00 | −2.6532E−01 | 2.1825E−02 |
| S10 | −5.2445E−02 | 6.8300E−01 | −1.7962E+00 | 2.5228E+00 | −2.2307E+00 | 1.2927E+00 | −4.8631E−01 | 1.0799E−01 | −1.0546E−02 |
| S11 | −4.3301E−01 | 1.6680E+00 | −4.4176E+00 | 7.9384E+00 | −9.6571E+00 | 7.6720E+00 | −3.7854E+00 | 1.0457E+00 | −1.2257E−01 |
| S12 | −1.4700E−01 | 2.6408E−02 | 1.8695E−01 | −3.7662E−01 | 3.3296E−01 | −1.7246E−01 | 5.3040E−02 | −7.6123E−03 | 1.7766E−04 |
| S13 | 1.9325E−01 | −6.3180E−01 | 8.4814E−01 | −7.0598E−01 | 2.7257E−01 | −1.1037E−02 | −1.8906E−02 | 2.8943E−03 | 2.1504E−04 |
| S14 | 7.1202E−02 | −7.1360E−02 | 1.8468E−02 | −4.8480E−03 | 7.6779E−03 | −5.4662E−03 | 1.7697E−03 | −2.7493E−04 | 1.6777E−05 |
| S15 | −4.1780E−01 | 2.7821E−01 | −6.3281E−02 | −6.1336E−03 | 2.7970E−03 | 1.2018E−03 | −6.0214E−04 | 9.0769E−05 | −4.7501E−06 |
| S16 | −1.9815E−01 | 1.1914E−01 | −4.6476E−02 | 1.1972E−02 | −2.2646E−03 | 3.5675E−04 | −4.4036E−05 | 3.3257E−06 | −1.0640E−07 |

Table 24 shows an effective focal lengths f1 to f8 of each lens in Embodiment 8, the total effective focal length f of the optical imaging lens, and the total optical length TTL.

TABLE 24

| f1 (mm) | 4.36 | f6 (mm) | −4.16 |
|---|---|---|---|
| f2 (mm) | −8.48 | f7 (mm) | 2.76 |
| f3 (mm) | 72.34 | f8 (mm) | −4.72 |
| f4 (mm) | 7.00 | f (mm) | 3.55 |
| f5 (mm) | −52.96 | TTL (mm) | 4.70 |

Figure 16A:
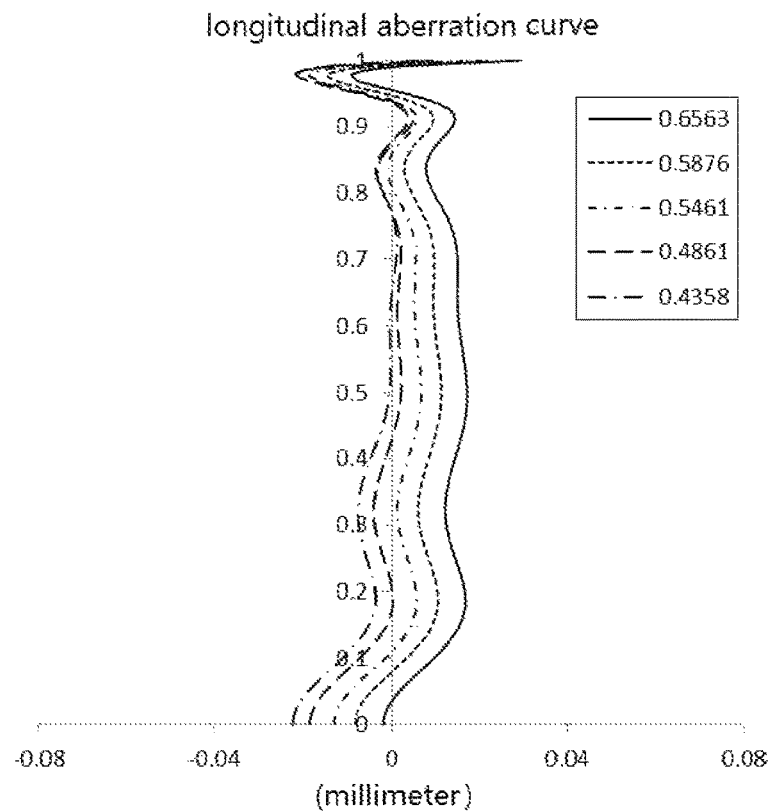
FIGS. 16A to 16D show a longitudinal aberration curve, an astigmatism curve, a distortion curve, and a lateral color curve of the optical imaging lens of Embodiment 8, respectively.
Figure 16B:
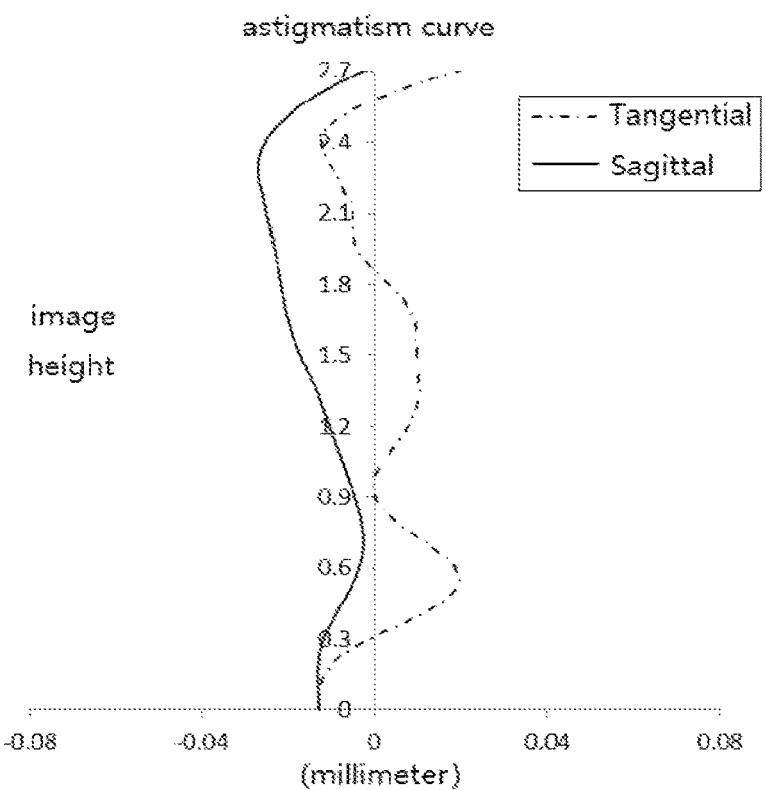
Figure 16C:
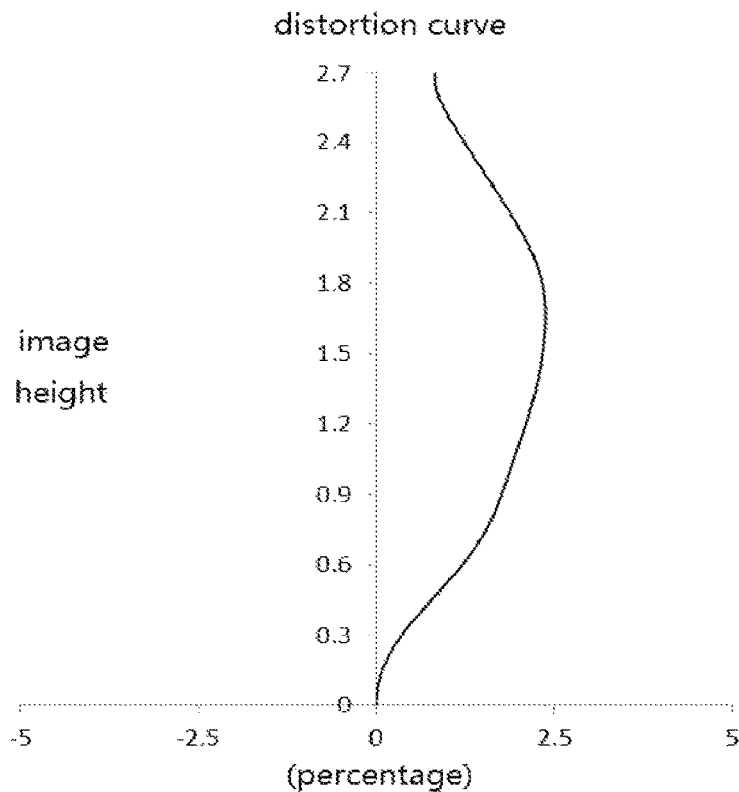
Figure 16D:
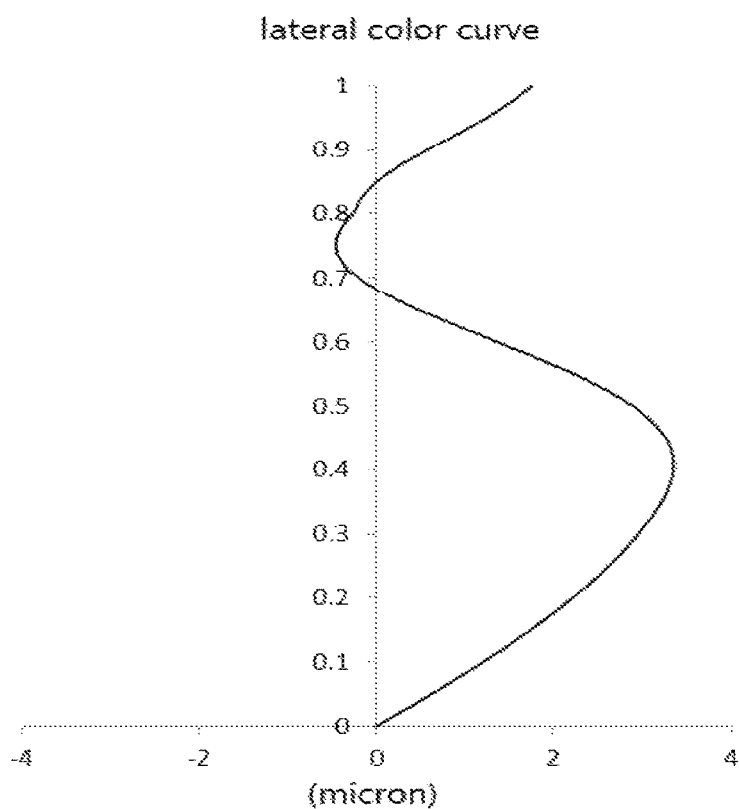

FIG. 16A shows a longitudinal aberration curve of the optical imaging lens of Embodiment 8, which indicates the deviations of light of different wavelengths from a convergent focus point after passing through the lens. FIG. 16B shows an astigmatism curve of the optical imaging lens of Embodiment 8, which indicates a tangential image plane curvature and a sagittal image plane curvature. FIG. 16C shows a distortion curve of the optical imaging lens of Embodiment 8, which indicates a distortion value under different image heights. FIG. 16D shows the lateral color curve of the optical imaging lens of Embodiment 8, which indicates the deviation of different image heights on the imaging surface of light passing through the lens. It can be seen from FIGS. 16A to 16D that, the optical imaging lens provided in Embodiment 8 can achieve good imaging quality.

Embodiment 9

Figure 17:
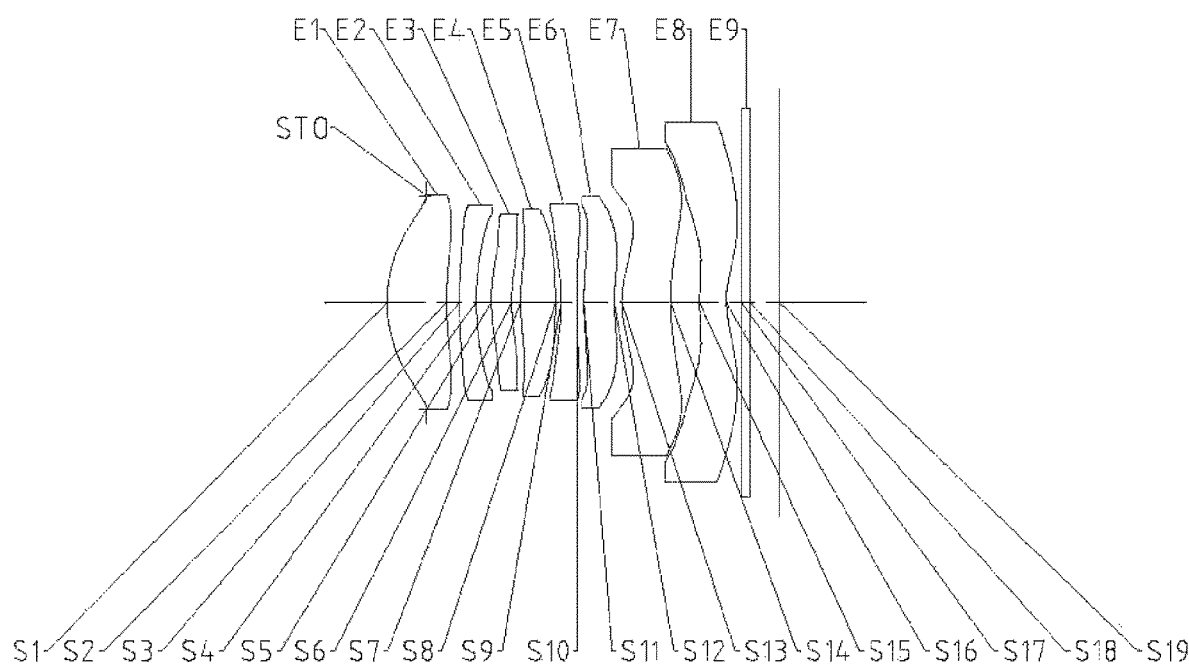
FIG. 17 shows a schematic view showing the structure of an optical imaging lens according to Embodiment 9 of the disclosure.

An optical imaging lens according to Embodiment 9 of the disclosure is described below with reference to FIGS. 17 to 18D. FIG. 17 is a schematic view showing a structure of an optical imaging lens according to Embodiment 9 of the disclosure.

As shown in FIG. 17, the optical imaging lens comprises sequentially from an object side to an image side along an optical axis: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive refractive power, an object side surface S1 of the first lens is a convex surface and an image side surface S2 of the first lens is a concave surface. The second lens E2 has a negative refractive power, an object side surface S3 of the second lens is a convex surface and an image side surface S4 of the second lens is a concave surface. The third lens E3 has a positive refractive power, an object side surface S5 of the third lens is a convex surface and an image side surface S6 of the third lens is a concave surface. The fourth lens E4 has a positive refractive power, an object side surface S7 of the fourth lens is a convex surface and an image side surface S8 of the fourth lens is a convex surface. The fifth lens E5 has a negative refractive power, an object side surface S9 of the fifth lens is a concave surface and an image side surface S10 of the fifth lens is a concave surface. The sixth lens E6 has a negative refractive power, an object side surface S11 of the sixth lens is a convex surface and an image side surface S12 of the sixth lens is a concave surface. The seventh lens E7 has a positive refractive power, an object side surface S13 of the seventh lens is a convex surface and an image side surface S14 of the seventh lens is a concave surface. The eighth lens E8 has a negative refractive power, an object side surface S15 of the eighth lens is a convex surface and an image side surface S16 of the eighth lens is a concave surface. The filter E9 has an object side surface S17 and an image side surface S18. Light from the object passes sequentially through the respective surfaces S1 to S18 and is finally imaged at the imaging surface S19.

Table 25 shows the surface types, curvature radius, thickness, materials, and conic coefficient of each lens of the optical imaging lens of Embodiment 9, wherein the curvature radius and thickness are in millimeters (mm).

TABLE 25

| Surface Number | Surface types | Curvature radius | Thickness | Materials Refractive index | Abbe number | Conic coefficient |
|---|---|---|---|---|---|---|
| OBJ | Spherical | Infinity | Infinity | | | |
| STO | Spherical | Infinity | 0.5200 | | | |
| S1 | Aspherical | 1.7944 | 0.7283 | 1.547 | 56.1 | −1.6604 |
| S2 | Aspherical | 5.2674 | 0.1603 | | | −22.2473 |
| S3 | Aspherical | 6.4409 | 0.2010 | 1.668 | 20.4 | −11.4579 |
| S4 | Aspherical | 3.2438 | 0.1895 | | | 5.0501 |
| S5 | Aspherical | 2.2524 | 0.2477 | 1.547 | 56.1 | 57.7185 |
| lS6 | Aspherical | 2.3391 | 0.1130 | | | 11.2105 |
| S7 | Aspherical | 3.4288 | 0.4284 | 1.547 | 56.1 | 1.4100 |
| S8 | Aspherical | 11.2638 | 0.0682 | | | 47.9614 |
| S9 | Aspherical | 3.5311 | 0.2030 | 1.658 | 21.5 | 17.2742 |
| S10 | Aspherical | 500.0000 | 0.0857 | | | −99.0000 |
| S11 | Aspherical | 3.6268 | 0.3714 | 1.658 | 21.5 | −4.5949 |
| S12 | Aspherical | 2.0084 | 0.0944 | | | −68.7230 |
| S13 | Aspherical | 1.3009 | 0.5987 | 1.621 | 25.9 | 19.1180 |
| S14 | Aspherical | 4.3027 | 0.3537 | | | −35.1430 |
| S15 | Aspherical | 2.8030 | 0.3304 | 1.537 | 55.7 | 10.9824 |
| S16 | Aspherical | 1.3214 | 0.1867 | | | −6.2267 |
| S17 | Spherical | Infinity | 0.1100 | 1.517 | 64.2 | |
| S18 | Spherical | Infinity | 0.3596 | | | |
| S19 | Spherical | Infinity | | | | |

It can be seen from Table 25 that in Embodiment 9, both the object side surface and the image side surface of any one of the first lens E1 to the eighth lens E8 are aspherical surface. Table 26 shows higher order term coefficients that can be used for each aspherical mirror in Embodiment 9, wherein each aspherical surface type can be defined by Equation (1) given in Embodiment 1 above.

TABLE 26

| Surface Number | A4 | A6 | A8 | A10 | A12 | A 14 | A16 | A18 | A20 |
|---|---|---|---|---|---|---|---|---|---|
| S1 | 3.2649E−02 | 7.5889E−03 | −3.2768E−02 | 5.1728E−02 | −5.7202E−02 | 4.2761E−02 | 2.1616E−02 | 6.0665E−03 | 6.9655E−04 |
| S2 | 3.2507E−02 | −1.1407E−01 | 2.1624E−01 | −4.5971E−01 | 6.2502E−01 | −5.0497E−01 | 2.3891E−01 | −6.1442E−02 | 6.6382E−03 |
| S3 | −1.2507E−02 | 1.4348E−01 | −7.0697E−01 | 1.3315E+00 | −1.3877E+00 | 8.9730E−01 | 3.5733E−01 | 8.0189E−02 | −7.7472E−03 |
| S4 | −3.0354E−02 | −9.7397E−02 | 5.4097E−01 | 2.0903E+00 | 4.3730E+00 | 5.1833E+00 | 3.5388E+00 | −1.2950E+00 | 1.9630E−01 |
| S5 | 3.3538E−01 | −1.4324E+00 | 4.0924E+00 | 8.6584E+00 | 1.2251E+01 | −1.1290E+01 | 6.5611E+00 | −2.1727E+00 | 3.0988E−01 |
| S6 | −2.2390E−01 | 8.7812E−01 | −2.8007E+00 | 5.8704E+00 | −8.9096E+00 | 9.2147E+00 | −5.9156E+00 | 2.1115E+00 | −3.1982E−01 |
| S7 | 1.6378E−01 | 1.4249E−01 | 1.5101E−01 | −5.2226E−01 | −3.2077E−01 | 1.8339E+00 | −2.0083E+00 | 9.4831E−01 | 1.6870E−01 |
| S8 | 2.5036E−01 | 1.5800E−01 | 4.0005E+00 | −1.2673E+01 | 2.0410E+01 | 1.9496E+01 | 1.1174E+01 | −3.5577E+00 | 4.8533E−01 |
| 59 | −1.7639E−01 | 3.7521E−01 | 1.6114E+00 | −7.4712E+00 | 1.3315E+01 | −1.3045E+01 | 7.3584E+00 | −2.2359E+00 | 2.8272E−01 |
| S10 | 1.4165E−01 | 9.8308E−01 | −2.3109E+00 | 2.9918E+00 | −2.3763E+00 | 1.1744E+00 | −3.5269E−01 | 5.8423E−02 | −3.9035E−03 |
| S11 | −3.6586E−01 | 1.2009E+00 | −2.9494E+00 | 5.2152E+00 | −6.4895E+00 | 5.3780E+00 | −2.7883E+00 | 8.0954E−01 | −9.9543E−02 |
| S12 | −9.5450E−02 | −3.7467E−01 | 1.2191E+00 | −1.8410E+00 | 1.5831E+00 | −7.9812E−01 | 2.1945E−01 | −2.5280E−02 | 3.9444E−05 |
| S13 | 2.2114E−01 | −7.9117E−01 | 1.2709E+00 | −1.2914E+00 | 7.7649E−01 | 2.7049E−01 | 5.1761E−02 | 4.5321E−03 | 8.6763E−05 |
| S14 | 8.8082E−02 | −1.3225E−01 | 1.2323E−01 | −1.0246E−01 | 6.2458E−02 | −2.4787E−02 | 5.9607E−03 | −7.8498E−04 | 4.3443E−05 |
| S15 | −4.2408E−01 | 3.1723E−01 | −1.6031E−01 | 9.9008E−02 | 5.6431E−02 | 2.0167E−02 | −4.0927E−03 | 4.3507E−04 | 1.8857E−05 |
| S16 | −2.0629E−01 | 1.3399E−01 | −5.9703E−02 | 1.8680E−02 | −4.0264E−03 | 5.8343E−04 | −5.4259E−05 | 2.9111E−06 | 6.8000E−08 |

Table 27 shows an effective focal lengths f1 to f8 of each lens in Embodiment 9, the total effective focal length f of the optical imaging lens, and the total optical length TTL.

TABLE 27

| f1 (mm) | 4.64 | f6 (mm) | −7.52 |
|---|---|---|---|
| f2 (mm) | −10.04 | f7 (mm) | 2.79 |
| f3 (mm) | 55.34 | f8 (mm) | −5.05 |
| f4 (mm) | 4.86 | f (mm) | 3.53 |
| f5 (mm) | −5.33 | TTL (mm) | 4.83 |

Figure 18A:
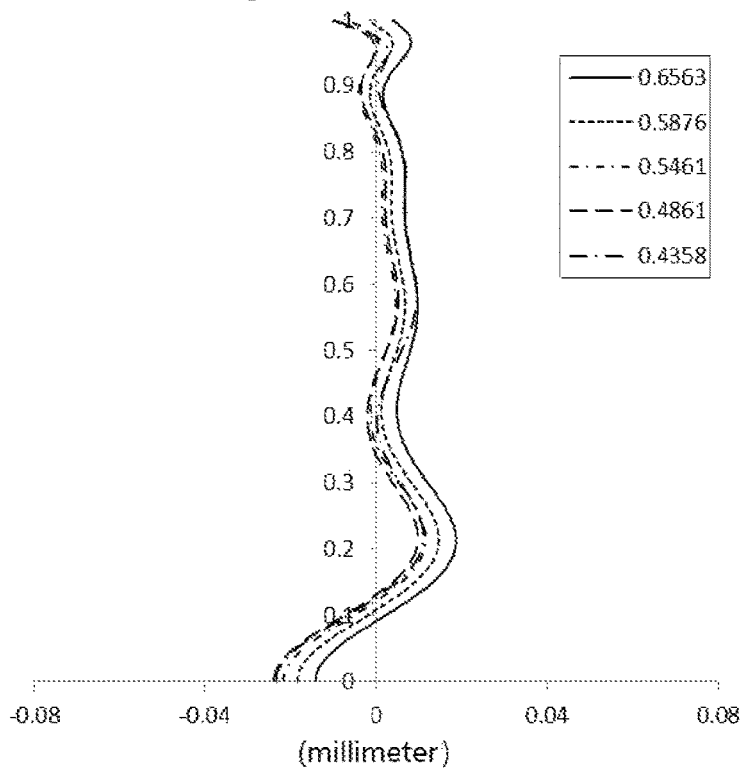
FIGS. 18A to 18D show a longitudinal aberration curve, an astigmatism curve, a distortion curve, and a lateral color curve of the optical imaging lens of Embodiment 9, respectively.
Figure 18B:
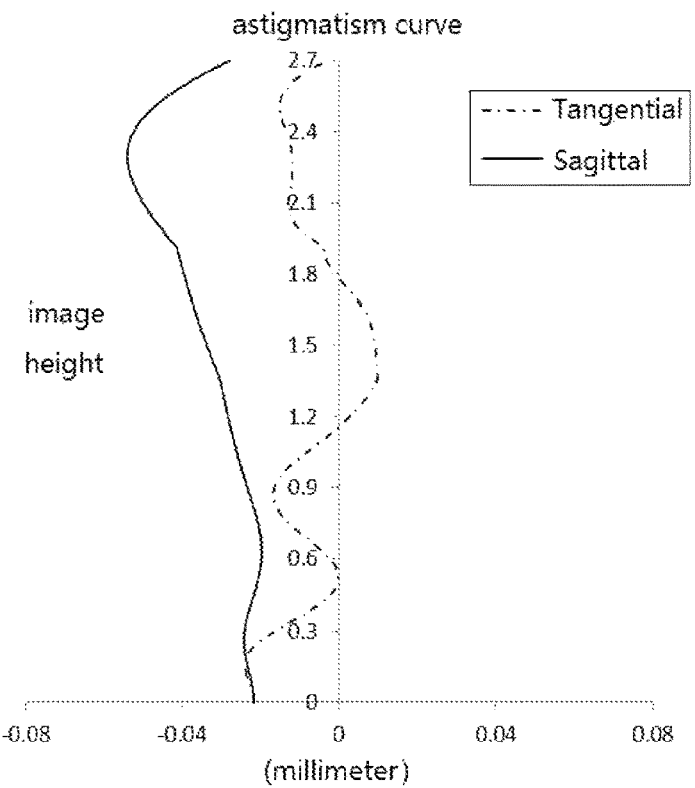
Figure 18C:
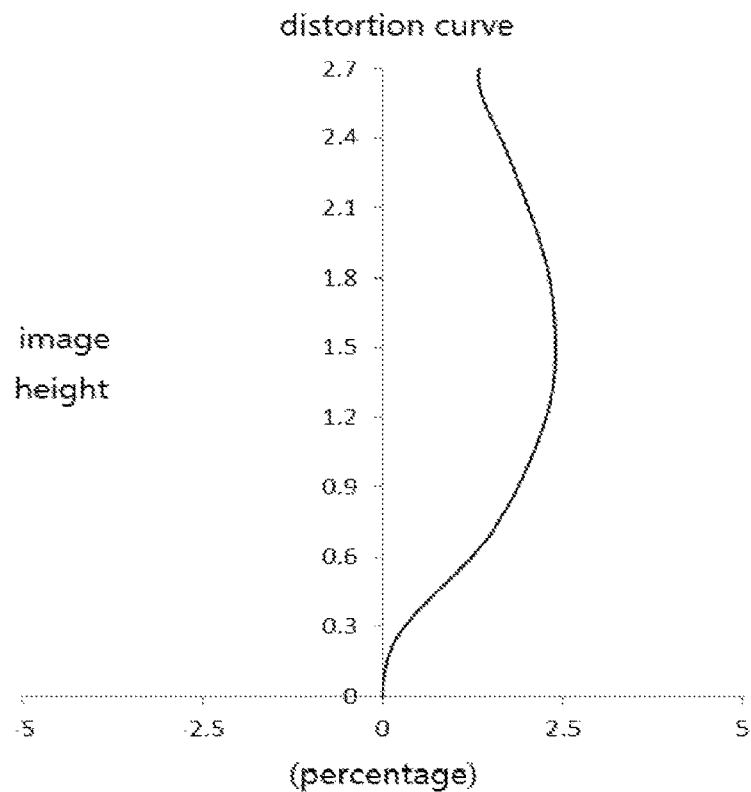
Figure 18D:
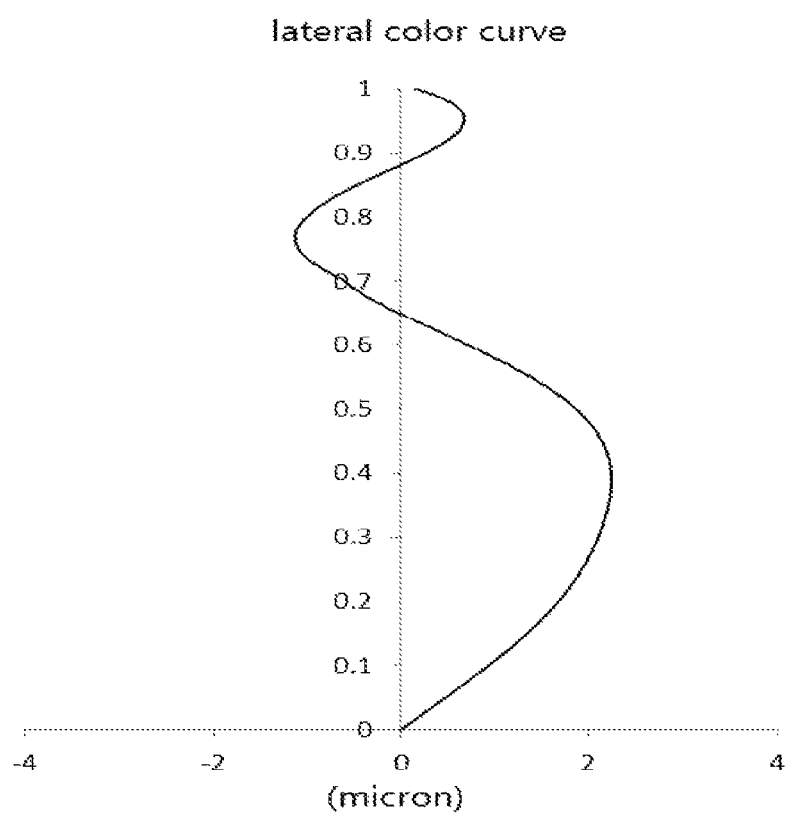

FIG. 18A shows a longitudinal aberration curve of the optical imaging lens of Embodiment 9, which indicates the deviations of light of different wavelengths from a convergent focus point after passing through the lens. FIG. 18B shows an astigmatism curve of the optical imaging lens of Embodiment 9, which indicates a tangential image plane curvature and a sagittal image plane curvature. FIG. 18C shows a distortion curve of the optical imaging lens of Embodiment 9, which indicates a distortion value under different image heights. FIG. 18D shows the lateral color curve of the optical imaging lens of Embodiment 9, which indicates the deviation of different image heights on the imaging surface of light passing through the lens. It can be seen from FIGS. 18A to 18D that, the optical imaging lens provided in Embodiment 9 can achieve good imaging quality.

In summary, Embodiments 1 to 9 satisfy the relationships shown in Table 28, respectively.

TABLE 28

| Condition expression | EMBODIMENT | | | | | | | | |
|---|---|---|---|---|---|---|---|---|---|
| | 1 | 2 | 3 | 4 | 5 | 6 | 7 | 8 | 9 |
| fx(TTL/EPD)(mm) | 6.13 | 6.46 | 7.09 | 5.78 | 6.83 | 6.14 | 5.96 | 6.23 | 6.16 |
| f4/f5 | −0.72 | −0.60 | −0.55 | −0.76 | −0.69 | −2.74 | −0.43 | −0.13 | −0.91 |
| f/R14 | 0.77 | 1.02 | 0.60 | 1.08 | 0.90 | 0.77 | 1.02 | 0.74 | 0.82 |
| R15/R16 | 2.79 | 3.33 | 2.53 | 1.92 | 2.94 | 3.67 | 3.01 | 2.76 | 2.12 |
| f/f34 | 0.75 | 0.78 | 0.74 | 0.70 | 0.74 | 0.73 | 0.62 | 0.54 | 0.76 |
| f/f56 | −0.81 | −0.73 | −1.30 | −0.94 | −0.45 | −0.72 | −0.85 | −0.93 | −1.20 |
| f7/f8 | −0.91 | −1.10 | −0.62 | −0.73 | −1.46 | −1.01 | −0.68 | −0.58 | −0.55 |
| f/f1 | 0.81 | 0.57 | 0.52 | 0.76 | 0.78 | 0.87 | 0.79 | 0.82 | 0.76 |
| \|f/f2\| + \|f/f3\| + \|f/f6\| | 0.90 | 0.64 | 0.85 | 0.89 | 0.49 | 1.31 | 1.00 | 1.32 | 0.88 |
| DT31/DT62 | 0.89 | 0.93 | 0.87 | 0.84 | 0.84 | 0.83 | 0.87 | 0.84 | 0.84 |
| (CT3 + CT4 + CT5 + CT6)/4 | 0.30 | 0.32 | 0.32 | 0.28 | 0.29 | 0.32 | 0.28 | 0.27 | 0.31 |
| ΣAT/TTL | 0.25 | 0.27 | 0.22 | 0.26 | 0.26 | 0.22 | 0.25 | 0.24 | 0.22 |
| R11/R12 | 1.79 | 1.87 | 3.32 | 1.86 | 0.99 | 1.54 | 2.17 | 2.54 | 1.81 |

The disclosure also provides an imaging device, wherein the electronic photosensitive element can be a charge coupled device (CCD) or a complementary metal oxide semiconductor (CMOS). The imaging device can be a stand-alone imaging device, such as a digital camera, or an imaging module integrated on a mobile electronic equipment, such as a cell phone. The imaging device is equipped with the optical imaging lens described above.

The foregoing description is only a preferred embodiment of the disclosure and is illustrative of the technical principles employed. It should be understood by a person skilled in the art that the scope of the invention referred to in the disclosure is not limited to the specific combination of the above-mentioned features, but also covers other features formed by any combination of the above-mentioned features or their equivalents without departing from the inventive concept. For example, the above-mentioned features and technical features disclosed in the disclosure (but not limited to) having similar functions are mutually replaced to form a technical solution.

What is claimed is:

1. An optical imaging lens, comprising sequentially from an object side to an image side along an optical axis: a first lens, a second lens, a third lens, a fourth lens, a fifth lens, a sixth lens, a seventh lens and an eighth lens, wherein
the first lens has a positive refractive power: the second lens has a refractive power; the third lens has a refractive power; the fourth lens has a positive refractive power; the fifth lens has a negative refractive power; the sixth lens has a refractive power; the seventh lens has a positive refractive power; the eighth lens has a negative refractive power; and
a total effective focal length f of the optical imaging lens, EPD is an Entrance Pupil Diameter of the optical imaging lens, and TTL is a distance along the optical axis between an object side surface of the first lens and an imaging surface of the optical imaging lens satisfy 5 mm<fx(TTL/EPD)<7.2 mm.

2. The optical imaging lens as claimed in 1, wherein, an effective focal length f4 of the fourth lens and an effective focal length f5 of the fifth lens satisfy −3.0<f4/f5<0.

3. The optical imaging lens as claimed in 1, wherein, the total effective focal length f of the optical imaging lens and a curvature radius R14 of an image side surface of the seventh lens satisfy 0.5<f/R14<1.2.

4. The optical imaging lens as claimed in 1, wherein a curvature radius R15 of an object side surface of the eighth lens and a curvature radius R16 of an image side surface of the eighth lens satisfy 1.5<R15/R16<4.0.

5. The optical imaging lens as claimed in 1, wherein, the total effective focal length f of the optical imaging lens and a combined focal length f34 of the third lens and the fourth lens satisfy 0.5<f/f34<1.0.

6. The optical imaging lens as claimed in 1, wherein, the total effective focal length f of the optical imaging lens and a combined focal length f56 of the fifth lens and the sixth lens satisfy −1.5<f/f56<0.

7. The optical imaging lens as claimed in 1, wherein, an effective focal length f7 of the seventh lens and an effective focal length f8 of the eighth lens satisfy −1.5<f7/f8<−0.5.

8. The optical imaging lens as claimed in 1, wherein, the total effective focal length f of the optical imaging lens and an effective focal length f1 of the first lens satisfy 0.5<f/f1<1.0.

9. The optical imaging lens as claimed in 1, wherein, the total effective focal length f of the optical imaging lens, an effective focal length f2 of the second lens, an effective focal length f3 of the third lens, and an effective focal length f6 of the sixth lens satisfy |f/f2|+|f/f3|+|f/f6|<1.5.

10. The optical imaging lens as claimed in 1, wherein an effective radius DT31 of an object side surface of the third lens and an effective radius DT62 of an image side surface of the sixth lens satisfy 0.8<DT31/DT62<1.0.

11. The optical imaging lens as claimed in 1, wherein a curvature radius R11 of an object side surface of the sixth lens and a curvature radius R12 of an image side surface of the sixth lens satisfy 0.5<R11/R12<3.5.

12. The optical imaging lens as claimed in 1, wherein a center thickness CT3 along the optical axis of the third lens, a center thickness CT4 along the optical axis of the fourth lens, a center thickness CT5 along the optical axis of the fifth lens and a center thickness CT6 along the optical axis of the sixth lens satisfy (CT3+CT4+CT5+CT6)/4<0.35.

13. The optical imaging lens as claimed in claim 1, wherein a sum of spacing distances SAT of any two adjacent lenses of the first lens to the eighth lens along the optical axis and the distance TTL from the object side surface of the first lens to the imaging surface of the optical imaging lens along the optical axis satisfy EAT/TTL<0.3.

14. An optical imaging lens, comprising sequentially from an object side to an image side along an optical axis: a first lens, a second lens, a third lens, a fourth lens, a fifth lens, a sixth lens, a seventh lens and an eighth lens, wherein
the first lens has a positive refractive power: the second lens has a refractive power; the third lens has a refractive power; the fourth lens has a positive refractive power; the fifth lens has a negative refractive power; the sixth lens has a refractive power; the seventh lens has a positive refractive power, and an image side surface of the seventh lens is concave: the eighth lens has a negative refractive power; and a total effective focal length f of the optical imaging lens and a curvature radius R14 of the image side surface of the seventh lens satisfy 0.5<f/R14<1.2:
a total effective focal length f of the optical imaging lens, EPD is an Entrance Pupil Diameter of the optical imaging lens, and TTL is a distance along the optical axis between an object side surface of the first lens and an imaging surface of the optical imaging lens satisfy 5 mm<f×(TTL/EPD)<7.2 mm.

15. The optical imaging lens as claimed in 14, wherein, an effective focal length f4 of the fourth lens and an effective focal length f5 of the fifth lens satisfy −3.0<f4/f5<0.

16. The optical imaging lens as claimed in 14, wherein a curvature radius R15 of an object side surface of the eighth lens and a curvature radius R16 of an image side surface of the eighth lens satisfy 1.5<R15/R16<4.0.

17. The optical imaging lens as claimed in 14, wherein, the total effective focal length f of the optical imaging lens and a combined focal length f 34 of the third lens and the fourth lens satisfy 0.5<f/f34<1.0.

18. The optical imaging lens as claimed in 14, wherein, the total effective focal length f of the optical imaging lens and a combined focal length f56 of the fifth lens and the sixth lens satisfy −1.5<f/f56<0.

19. The optical imaging lens as claimed in 14, wherein, an effective focal length f7 of the seventh lens and an effective focal length f8 of the eighth lens satisfy −1.5<f7/f8<−0.5.

20. The optical imaging lens as claimed in 14, wherein, the total effective focal length f of the optical imaging lens and an effective focal length f1 of the first lens satisfy 0.5<f/f1<1.0.

* * * * *